United States Patent [19]
Urruela et al.

[11] Patent Number: 6,067,793
[45] Date of Patent: May 30, 2000

[54] VARIABLE GEOMETRY AXISYMMETRIC NOZZLE WITH 2-D THRUST VECTORING INTENDED FOR A GAS TURBINE ENGINE

[75] Inventors: José Rivacoba Urruela, Las Arenas; Kepa M. Aldecoa-Otalora, Bilbao, both of Spain

[73] Assignee: Sener, Ingenieria y Sistemas, S.A., Spain

[21] Appl. No.: 08/990,341

[22] Filed: Dec. 15, 1997

[30] Foreign Application Priority Data

Dec. 26, 1996 [ES] Spain ..................................... 9602744

[51] Int. Cl.⁷ ................................................. F02K 1/12
[52] U.S. Cl. .................... 60/230; 60/232; 239/265.33; 239/265.41
[58] Field of Search ............................. 60/228, 230, 232; 239/265.19, 265.33, 265.35, 265.37, 265.39, 265.41

[56] References Cited

U.S. PATENT DOCUMENTS 4,994,660  2/1991  Hauer ........................................ 60/232
5,329,763  7/1994  Mendia et al. ............................ 60/228
5,351,888  10/1994 Taylor et al. ............................. 60/232
5,398,499  3/1995  Urruela ..................................... 60/232
5,613,636  3/1997  Zubillaga et al. ................. 239/265.35

Primary Examiner—Ted Kim
Attorney, Agent, or Firm—Ostrolenk, Faber, Gerb & Soffen, LLP

[57] ABSTRACT

Axisymmetric nozzles of variable geometry and orientation of flow intended for gas turbine engines, especially for aircraft. The nozzle comprises control means for adjusting the throat area and vectoring the thrust, which means are formed by three rings concentric to the longitudinal axis of the engine, an inner ring, an intermediate ring, and an outer ring, and by a plurality of linear actuators. The outer ring includes two ring segments interarticulated to each other and swingable independently or in unison to vector the thrust of the aircraft, said swinging and corresponding thrust vectoring being limited to a single plane corresponding to the pitch of the aircraft.

12 Claims, 25 Drawing Sheets

VARIABLE GEOMETRY AXISYMMETRIC NOZZLE WITH 2-D THRUST VECTORING INTENDED FOR A GAS TURBINE ENGINE

BACKGROUND OF THE INVENTION

The present invention relates to improvements in axisymmetric nozzles of variable geometry and orientation of the flow which nozzles are intended for gas turbine engines, especially for use in aviation.

Axisymmetric nozzles of variable geometry are known which are capable of realizing three functions, namely: regulating a throat area A8 in accordance with a given law; symmetrically varying an exit area with respect to an immobilized throat area; and A9 vectoring thrust through the nozzle in 360 degrees.

The axisymmetric nozzle which is the subject of Spanish Patent No. 9401114 and corresponding U.S. Pat. No. 5,613,636 provides a fourth function: namely, asymmetrically correcting the exit area during thrust vectoring. The nozzle comprises a convergent zone which defines a throat of variable area and is formed by convergent master petals and by convergent slave petals resting on the adjacent convergent master petals, followed in the direction of the flow of gas by a divergent zone formed of divergent master petals and of divergent slave petals resting on the adjacent divergent master petals and connected to the adjacent divergent master petals by a centering mechanism. The petals of the convergent and divergent zones are distributed circumferentially around the longitudinal axis of the engine, and every convergent master petal is connected to a corresponding divergent master petal by a tangential cylindrical articulation having an axis perpendicular to the longitudinal axis of the engine. Each petal of the divergent zone is divided into two segments, an upstream segment and a downstream segment, attached to each other by cylindrical articulations having an axis perpendicular to the tangential cylindrical articulation between the convergent master petal and divergent master petal.

The nozzle further comprises control means for adjusting the throat area and vectoring the thrust, comprising an inner ring, an intermediate ring, and an outer ring, which rings are concentric with respect to each other and to the longitudinal axis of the engine. A plurality of linear actuators are also provided, each having an upstream end and a downstream end. A mechanism for regulating the throat area is also provided, the convergent master petals being attached to the inner ring by tangential cylindrical articulations having axes perpendicular to the longitudinal axis of the engine. The linear actuators are connected articulately at their upstream ends to a fixed structure of the engine, the linear actuator of one part of said plurality of linear actuators having its downstream end attached to spherical articulations of the outer ring and the linear actuator of the other part of each of said plurality of linear actuators having its downstream end connected to spherical articulations of the intermediate ring. Each of the rings is connected independently to the fixed structure of the engine by support means which does not interconnect the rings and maintains each ring fixed laterally.

The nozzle also comprises a set of two-hinged bars, one for each divergent master petal, which interconnect the downstream segments of the divergent master petals with the outer ring. The vectoring, in 360 degrees, of thrust in the divergent zone is obtained by inclination of the outer ring with a center of swing located on the longitudinal axis of the engine through the set of two-hinged bars.

Significantly, the outer ring includes two outer ring segments which are mutually articulated by a pair of cylindrical articulations which make it possible to vary symmetrically the exit area with respect to an immobilized throat area by simultaneously swinging the two outer ring segments in opposite directions, and, during vectoring of the flow of gas, by independently swinging one of the two outer ring segments to correct the exit area asymmetrically while the other outer ring segment remains immobilized.

An axisymmetric nozzle of variable geometry and orientation of flow having the outer ring configuration described above provides several advantages including, without limitation, the following:

1. By vectoring the divergent petals in individual groups, separations of the inner stream of the flow can be avoided which would otherwise take place with large angles of average orientation of the flow and low pressure conditions, which conditions are typical during aircraft landing. In order to avoid said separation, there is obtained a better coefficient of thrust without loss of effectiveness of orientation of the flow, since the energy dissipated upon generating the recirculation is utilized in thrust. Furthermore, the processes of separating fluid streams result in inherent instabilities of not very high frequency which, in a limit case, could be coupled with the frequency itself of the system.

2. If the geometrical vectoring of part of the petals is reduced, the area of oriented flow experienced by the stream outside the aircraft is also reduced. As a result, separations of the outer stream associated with the orientation of the flow are of less intensity. Therefore, the instabilities of such stream decrease, including the overall drag on the aircraft.

3. In an aircraft landing approach, the exit area of the nozzle is vectored downward. Upon decreasing the vectoring of the petals closest to the ground, there is a greater clearance between such petals and the ground in the rear part of the aircraft for the same angle of attack. This makes it possible to land the aircraft with a larger angle of attack and therefore with greater lift or, equivalently, with less speed.

In said Spanish Patent No. 9401114, two embodiments of a four-function nozzle described are described and claimed. U.S. Pat. No. 5,613,636, which corresponds to Spanish Patent No. 9401114, is hereby incorporated herein by reference.

In the first of the embodiments, called a single control system, the inner and intermediate rings and the inter-articulated outer ring segments are interconnected by two pairs of spindles, one pair perpendicular to the other pair. One of the pairs of spindles connects the intermediate ring to the inner ring, and the other pair of spindles connects the intermediate ring to the articulated ends of the outer ring segments, so as to constitute a single control system in combination with the plurality of linear actuators and the mechanism for regulating the throat area. Regulation of the area of the throat is obtained by an axial displacement of the assembly of rings and outer ring segments, and symmetric variation of the exit area with respect to an immobilized throat area is obtained by simultaneously swinging the two outer ring segments in opposite directions. Thrust vectoring is obtained by simultaneously swinging the two outer ring segments in the same direction with the centers of swing on the longitudinal axis of the engine, and asymmetric correction of the exit area during the vectoring of the flow of gas is obtained by independently swinging one of the two outer ring segments while the other outer ring segment remains stationary.

In the second of the embodiments, corresponding to the general case known as a two-control system, the inner and the intermediate rings and the interarticulated two outer ring segments are not connected to each other and constitute, in combination with the plurality of linear actuators and the throat area regulating mechanism, two control systems. The throat area is regulated by axial displacement of only the intermediate ring, and symmetric variation of the exit area with respect to an immobilized throat area is obtained by simultaneously swinging the two outer ring segments in opposite directions. Thrust vectoring is obtained by simultaneously swinging the two outer ring segments in the same direction with a single center of swing on the longitudinal axis of the engine, and asymmetric correction of the exit area during vectoring of the flow is obtained by independently swinging one of the two outer ring segments while the other outer ring segment remains stationary.

In this general case, the second embodiment with two control systems has the advantage, in addition to those mentioned, of a spherical configuration of the inner part of the fairing of the nozzle around the outer ring, since the two outer ring segments have a single point of swing.

The axisymmetric nozzles of variable geometry and orientation of the thrust in 360 degrees are optimum when applied to a gas turbine for aircraft having a single engine or a single jet. However, in the case of aircraft equipped with two engines or twin jets, when the two engines are very close to each other, there are difficulties in orienting the flow in 360 degrees.

A twin jet equipped with nozzles of double symmetry (or 2-D nozzles) has, in theory, properties of maneuverability which are very close to those exhibited by a single engine jet equipped with nozzle which vectors the thrust in 360 degrees. Although a 2-D nozzle vectors the thrust in a single plane which is the plane of pitch of the aircraft, the presence of two 2-D nozzles makes it possible, after an initial maneuver of rotating of the plane about its longitudinal axis by vectoring the thrust of one of the two nozzles or the thrusts of both nozzles simultaneously and in opposite directions, to orient the aircraft by vectoring the thrusts of the two nozzles simultaneously and in the same direction, in any of the directions. It is true that 2-D nozzles have the drawback of greater weight, in addition to great difficulties in the sealing of their components.

SUMMARY OF THE INVENTION

The present invention provides a nozzle which, being axisymmetric and of variable geometry and with the ability to perform the four functions described above (that is to say, similar in some respects to the nozzle disclosed in Spanish Patent No. 9401114), presents an improvement over the prior art by presenting a vectoring ability which is limited to a single plane: the plane of pitch of the aircraft. The present invention makes it possible, so that it is suitable for engines of twin-jet aircraft, to simplify some of the mechanical components of the nozzle, specifically the intermediate ring and the outer ring segments, as well as the articulation means which connect them together and to the fixed structure.

In the general embodiment of the present invention, being an axisymmetric nozzle of variable go geometry and orientation of the flow, regulation of the throat area symmetric variation of the exit area, vectoring of the thrust, and asymmetric correction of the exit area, are effected by two independent systems of control. The pair of spindles which interconnect the articulated ends of the two outer ring segments are fixed in the stationary structure of the engine, the axis of said spindles being normal to the longitudinal axis of the engine and being in the horizontal main theoretical plane which contains the longitudinal axis of the engine.

In addition to providing a greater rigidity of the assembly of outer ring segments by permitting a single degree of freedom as compared with the floating or flexible connection of the outer ring on the axisymmetric nozzles covered by U.S. Pat. No. 4,994,660 and Spanish Patent No. 9200369, the present invention provides the advantage of requiring a lesser number of linear control actuators for vectoring thrust, since at least two of the linear actuators which are necessary for vectoring the thrust in 360 degrees are not required.

Three possible embodiments, given by way of illustration, are described herein.

Two of the embodiments relate to the general case of an axisymmetric nozzle of variable geometry with orientation of the flow having two control systems, one for regulating the throat area and the other for symmetrically varying the exit area with respect to an immobilized throat area, vectoring the thrust, and asymmetrically correcting the exit area during the vectoring of the thrust. The nozzle has an inner ring which, bearing the upstream ends of each convergent petal, is rigidly attached to the fixed structure of the engine. An intermediate ring is axially movable by the actuators of a first control system for regulating the throat area. An outer ring, formed by two outer ring segments, the ends of which are interconnected articulately by two spindles bears the upstream ends of the biarticulated bars which support the downstream segments of the divergent master petals and is swung by the actuators of a second control system to vector the thrust, symmetrically vary the exit area, and correct the exit area asymmetrically. The spindles are fixed in the fixed structure of the engine.

Another embodiment for the special case of an axisymmetric nozzle of variable geometry with orientation of the flow has a single control system for regulating the throat area, symmetrically varying the exit area, vectoring the flow, and correcting the exit area. The nozzle has an inner ring bearing the upstream ends of each convergent petal, a reduced intermediate ring which loses its mobility incorporated with the fixed structure of the engine and an outer ring bearing the upstream ends of the two-hinged bars which support the downstream segments of the divergent master petals. The outer ring is formed by two outer ring segments, the ends of which are interconnected articulately by two spindles fixed in the inner ring, comprising, together with the linear actuators and the regulating mechanism of the throat area, a single control system which, by moving axially, regulates the throat area and, by swinging the outer ring segments symmetrically, varies the exit area, vectors the flow, and corrects the exit area.

Other features and advantages of the present invention will become apparent from the following description of the invention which refers to the accompanying drawings.

BRIEF DESCRIPTION OF THE DRAWINGS

All of the characteristics set forth above, as well as other characteristics of the invention, will be understood from the following description given with reference to the accompanying drawings, in which.

DETAILED DESCRIPTION OF THE PREFERRED EMBODIMENTS

FIGS. 1 to 11 illustrate a first embodiment of a nozzle in accordance with the present invention formed with two independent control systems, one for regulating a throat area A8 and the other for symmetrically varying an exit area A9 with respect to an immobilized throat area and for vectoring the flow of gas and asymmetrically correcting the exit area. A perimetral mechanism, such as that disclosed in Spanish Patent No. 9401114, may form part of the system for regulating the throat area.

Figure 11:
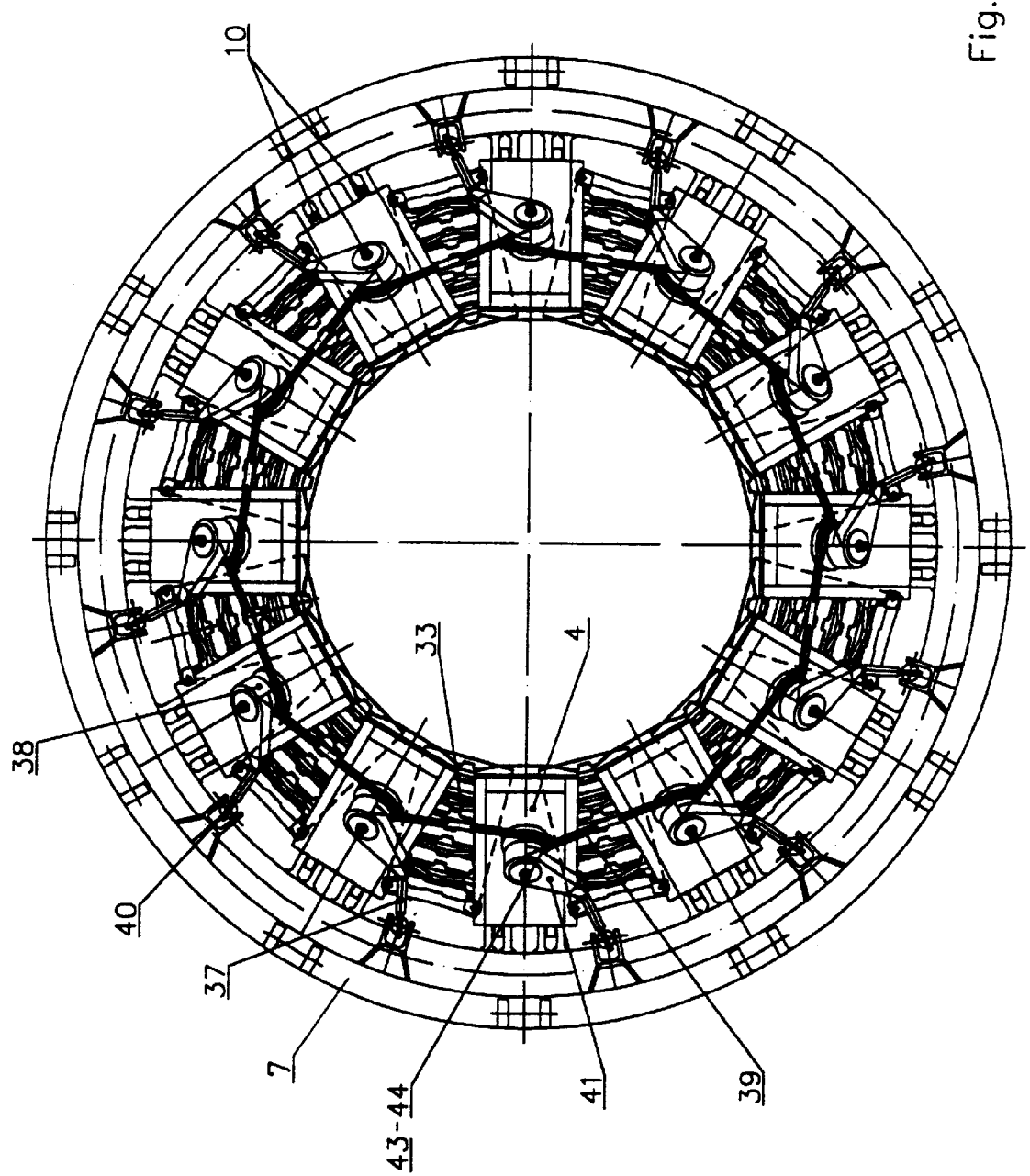
FIG. 11 shows the perimetral mechanism for regulating the throat area.

FIGS. 12 to 18 illustrate a second embodiment of a nozzle in accordance with the present invention formed with a single control system for regulating the throat area A8, symmetrically varying the exit area A9, vectoring the thrust and asymmetrically correcting the exit area, the same perimetral mechanism shown in FIG. 11 forming part of the single control system for regulating the throat area A8.

FIGS. 19 to 25 illustrate a third embodiment of a nozzle in accordance with the present invention with two independent control systems, one to regulate the throat area A8 and the other symmetrically to vary the exit area A9, vector the thrust and asymmetrically correct the exit area, a cam and roller mechanism forming part of the system for regulating the throat area A8.

Figure 1:
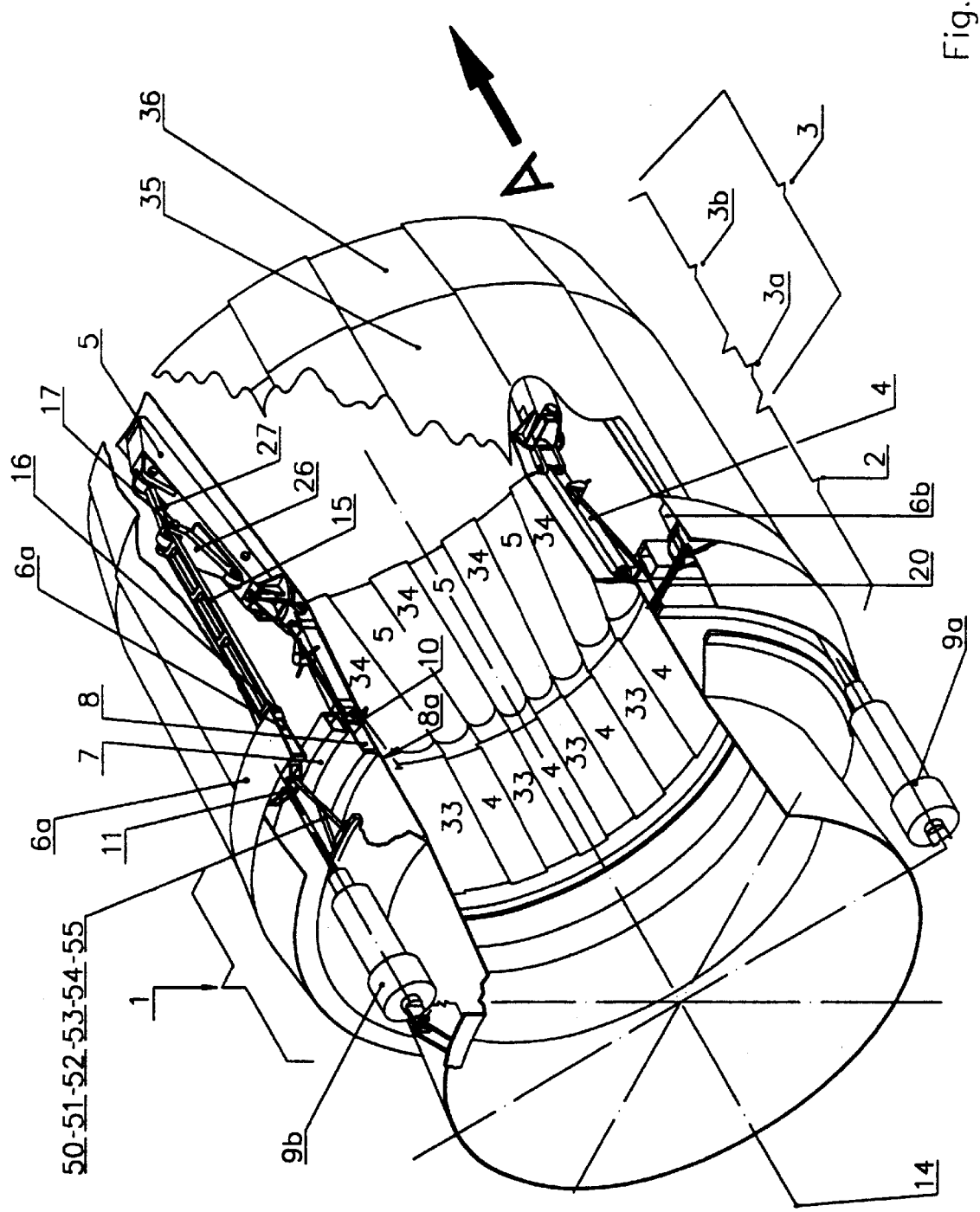
FIG. 1 is a perspective view, partially in section, of a first embodiment of an axisymmetric nozzle of variable geometry and orientation of flow of the present invention, having two systems of control and a perimetral mechanism for regulating the throat area.

FIG. 1 is a diagrammatic perspective view, partially in section, of the first nozzle embodiment of the present invention. The direction of flow or circulation of the gases is indicated by arrow A. As with traditional variable-geometry axisymmetric nozzles, the nozzle shown in FIG. 1 includes a rear casing 1, which constitutes the final end of the fixed structure of the engine, a convergent zone 2 and a divergent zone 3. The convergent zone 2 is formed by a plurality of master petals 4 and slave petals 33. In the same way, the divergent zone 3 is formed by master petals 5 and slave petals 34 and is divided into two portions: a non-vectorable portion 3a and a vectorable portion 3b.

The nozzle also includes a first control system for regulating the throat area A8, the throat area A8 being indicated by the reference numeral 12, and defined by the intersection between the convergent master petals 4 and the divergent master petals 5. The nozzle further includes a second independent control system for orientation of the flow, symmetric variation of the exit area A9 (the exit area A9 being indicated by the reference numeral 13) and asymmetric correction of said exit area.

The first control system for regulating the throat A8 is formed, in combination, of an inner ring 8, an intermediate ring 7, and a first set of linear actuators 9a. Inner ring 8 is concentric to a longitudinal axis of the engine and is connected rigidly to the fixed structure 1 of the engine. At its downstream end, inner ring 8 bears cylindrical joints 10 which connect articulately to the upstream ends of the convergent master petals 4. Intermediate ring 7 bears on its downstream side a perimetral mechanism, shown in FIG. 11, which connects the intermediate ring 7 to each of the convergent master petals 4. The first set of linear actuators 9a are articulated at their upstream end to the fixed structure of the engine 1, and are articulately connected at their downstream end to the upstream side of intermediate ring 7 by spherical articulations 11, as shown in particular in FIGS. 4 and 21.

The symmetric variation of the exit area A9, the orientation of the flow, and the asymmetric correction of the exit area are produced by the second control system which is formed, in combination, by two interarticulated outer ring segments 6a and 6b which together form an outer ring 6 concentric with the longitudinal axis 14 of the engine, and by a second set of linear actuators 9b which are articulated at their upstream end to the fixed structure of the engine 1.

Figure 2:
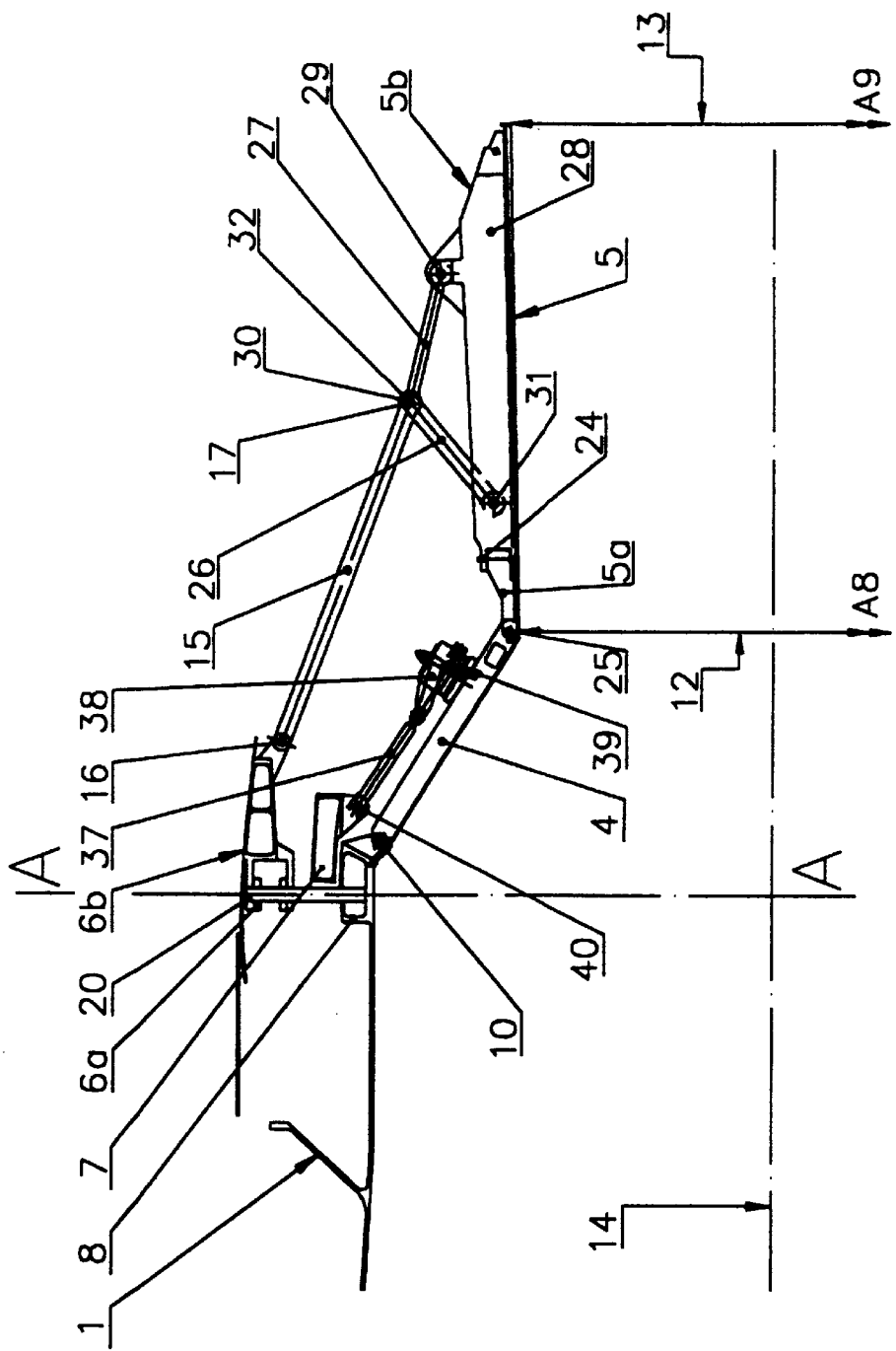
FIG. 2 is a longitudinal half-section, in the horizontal main longitudinal plane, of the first nozzle embodiment, the nozzle being in a closed-throat position, without variation and correction of the exit area, and without vectoring of the thrust.
Figure 3:
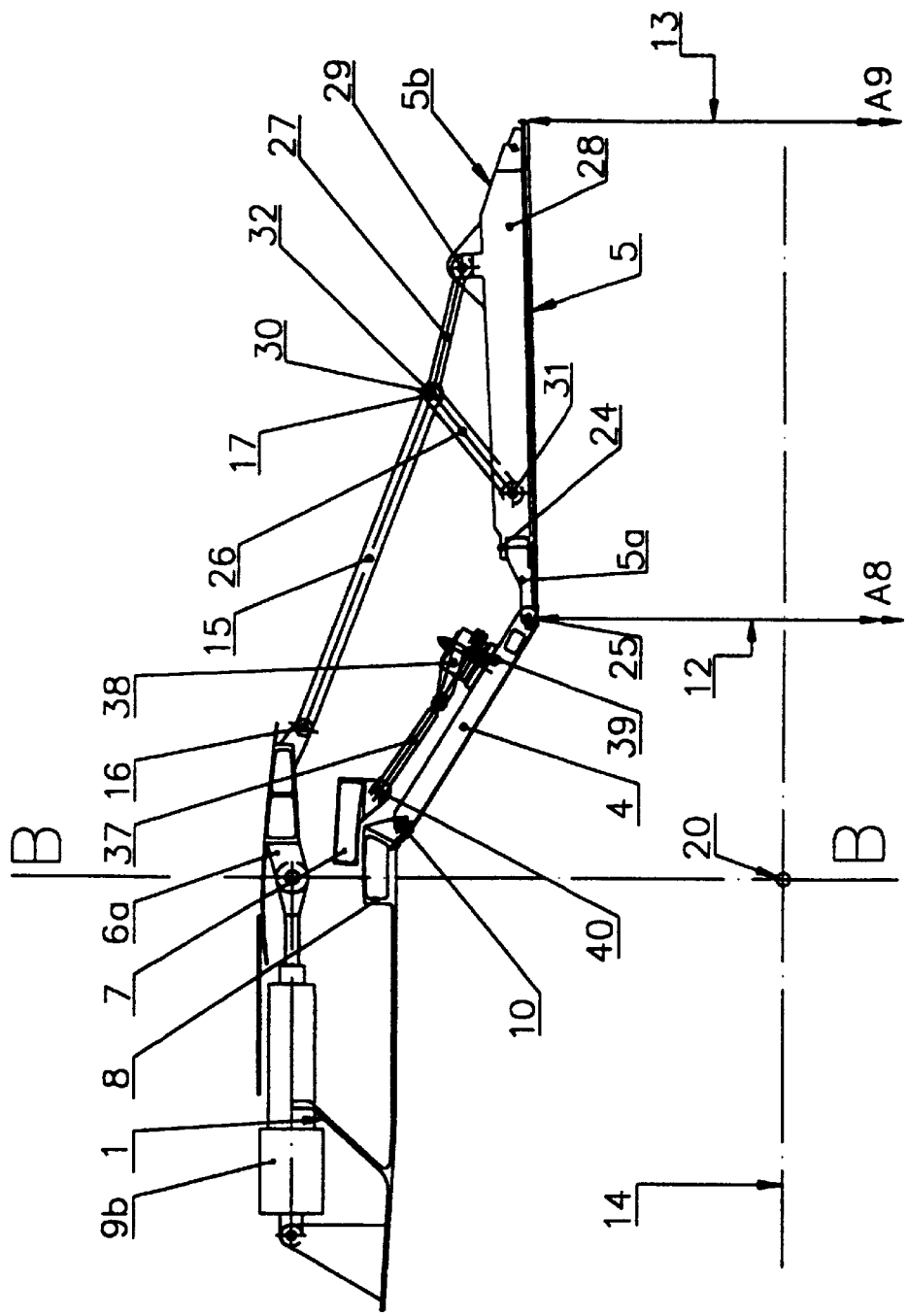
FIG. 3 is a longitudinal half-section, in the vertical main longitudinal plane, of the first nozzle embodiment, the nozzle being in the same position as shown in FIG. 2.
Figure 4:
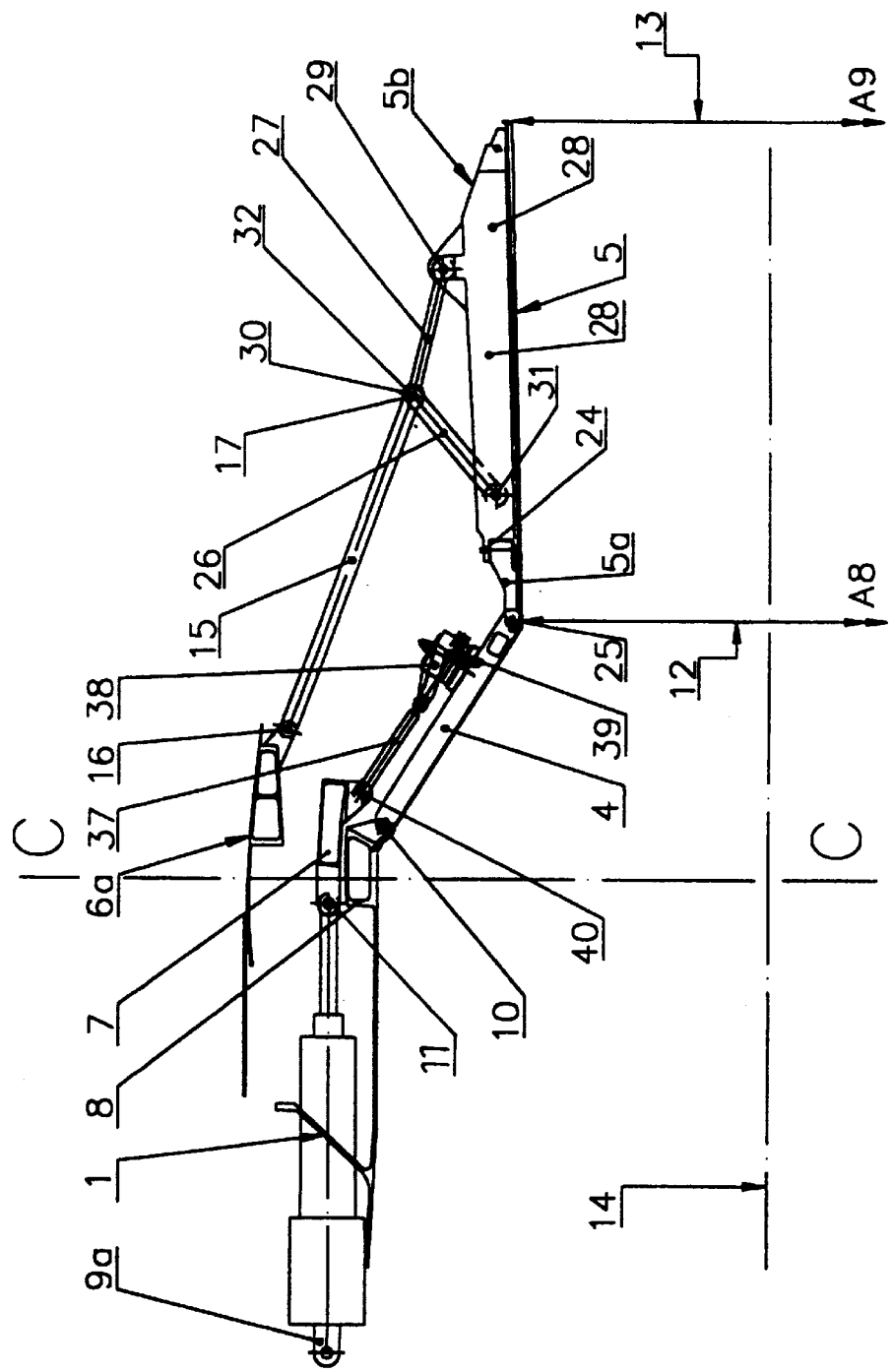
FIG. 4 is a longitudinal half-section, in a plane which forms an angle of 45 degrees with respect to the horizontal main longitudinal plane, of the first nozzle embodiment, the nozzle being in the same position as shown in FIG. 2.
Figure 5:
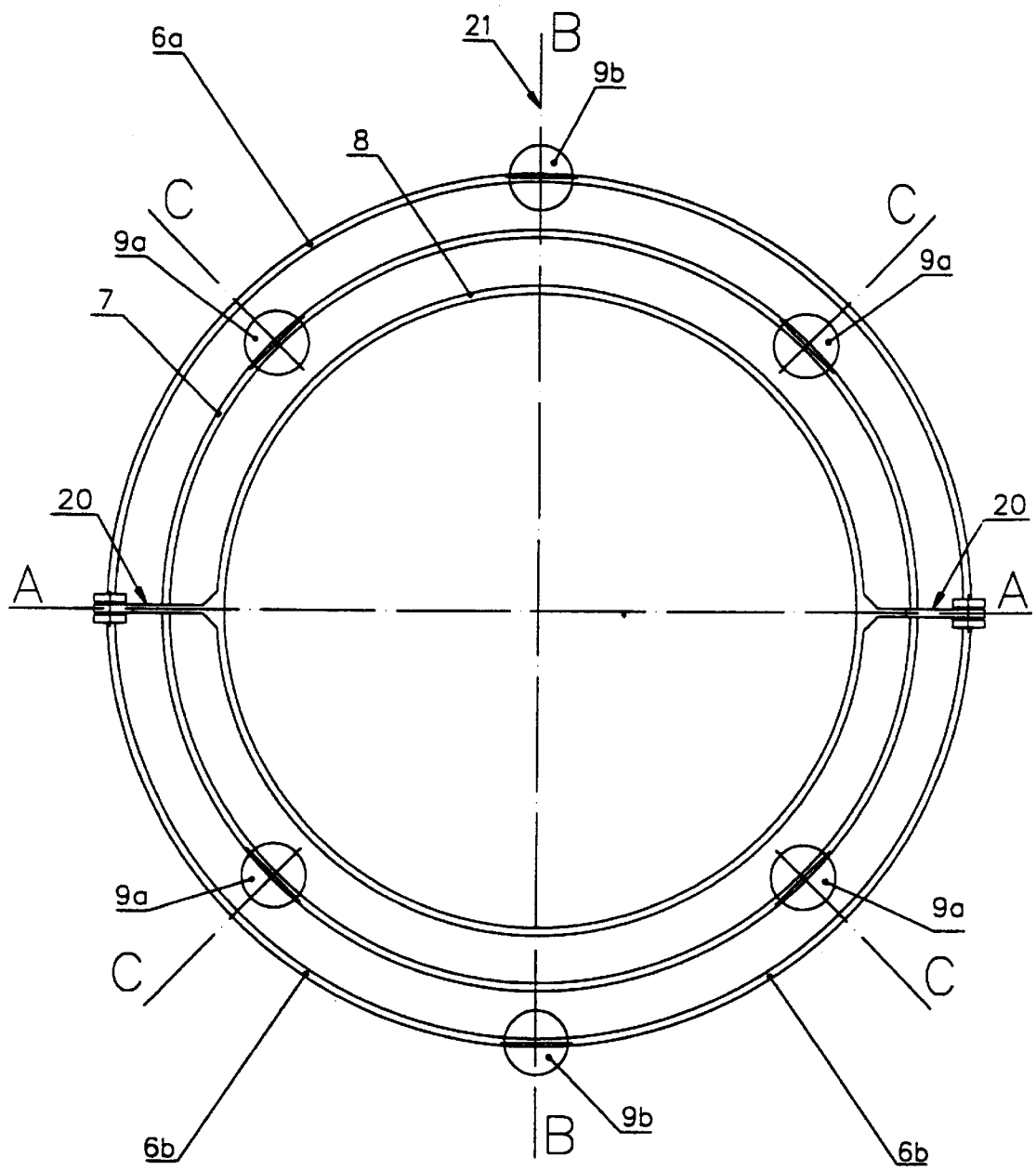
FIG. 5 is a cross-section through the first nozzle embodiment, along the section line B—B of FIG. 6, showing connections between rings and ring segments which, together with the linear actuators, form the two control systems.
Figure 6:
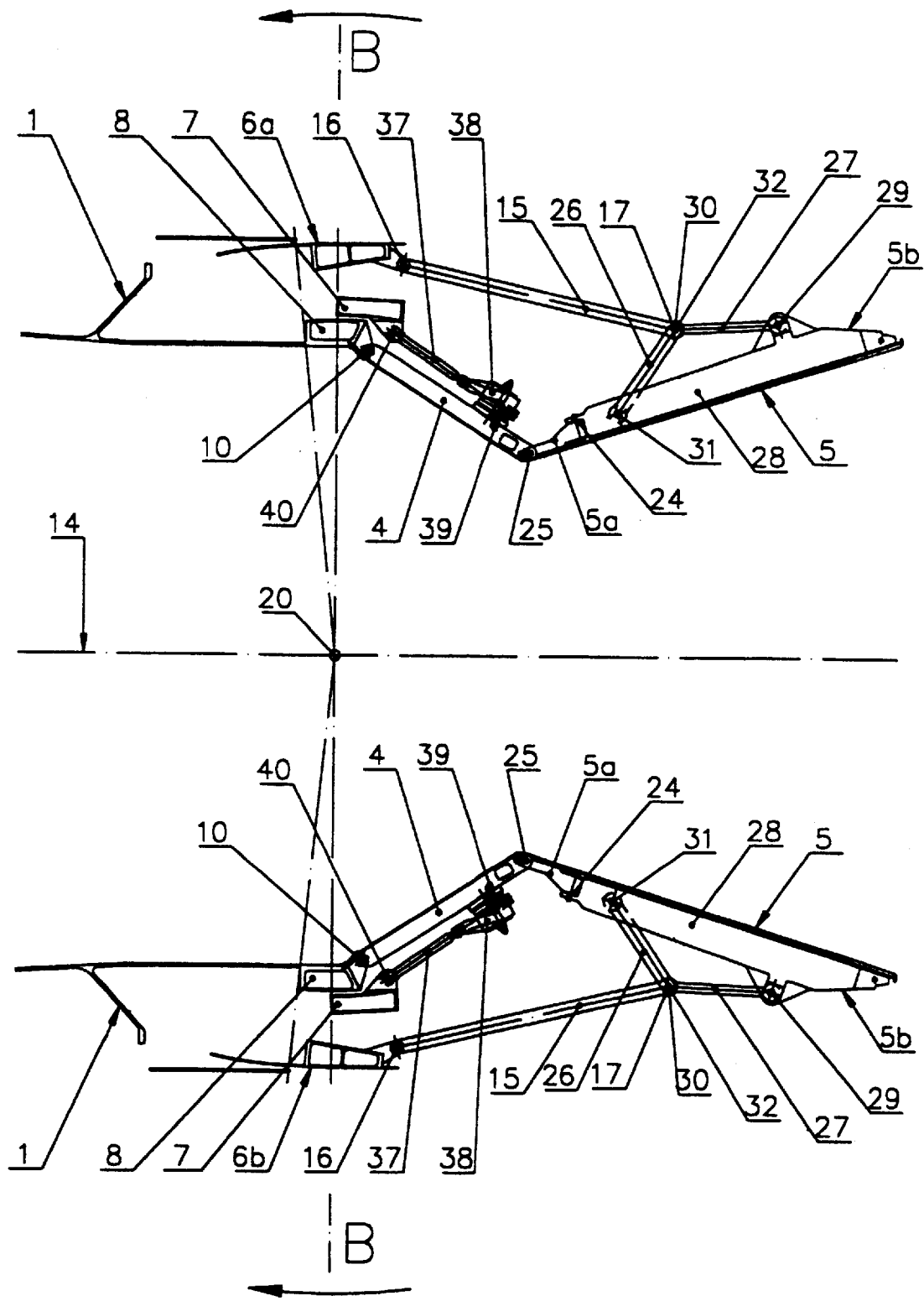
FIG. 6 is a longitudinal section, in a vertical main longitudinal plane, along the section line B—B of FIG. 5, of the first nozzle embodiment, the nozzle being in a closed-throat position with the exit area varied symmetrically and without vectoring of the thrust the arrows indicating the swing direction of the two outer ring segments.
Figure 7:
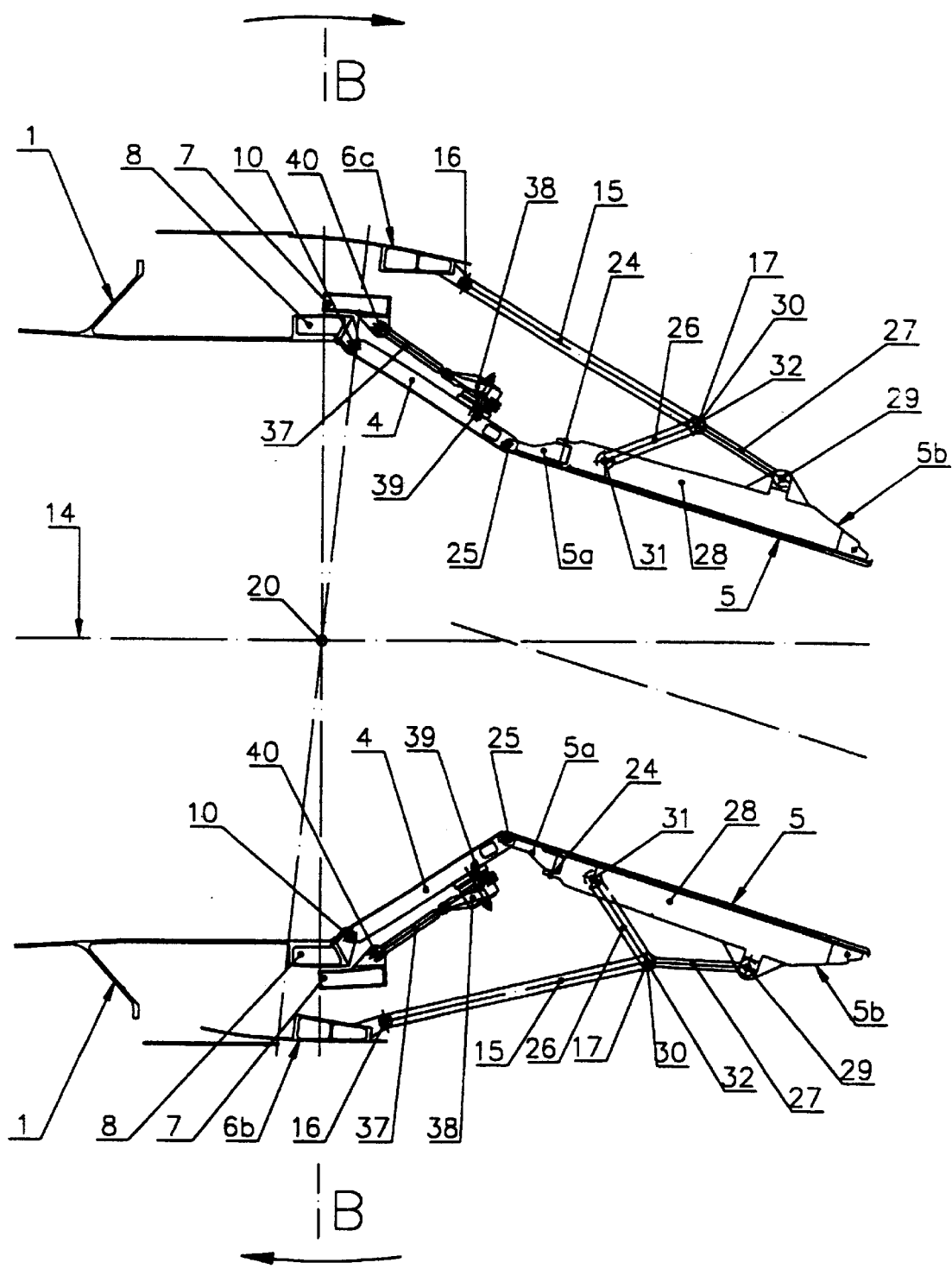
FIG. 7 shows the same longitudinal section through the first nozzle embodiment as shown in FIG. 6, the nozzle being in closed-throat position and with vectoring of the thrust.
Figure 8:
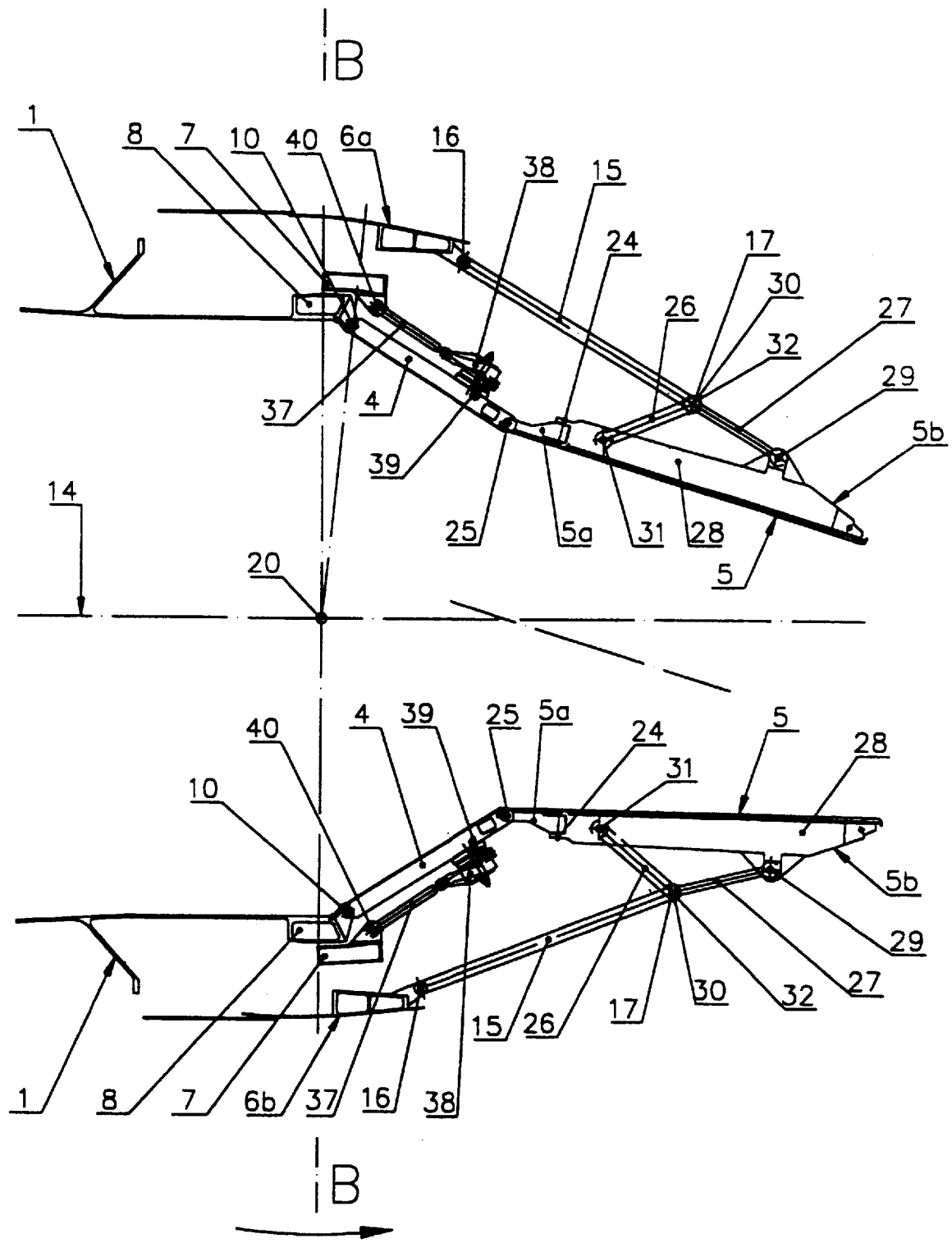
FIG. 8 shows the same longitudinal section of the first nozzle embodiment as shown in FIG. 6, the nozzle being in a closed-throat position, with vectoring of the thrust and with the exit area being asymmetrically corrected, the arrow indicating the swing direction of the lower outer ring segment for correcting the excessive angle of the lower divergent petals.
Figure 9:
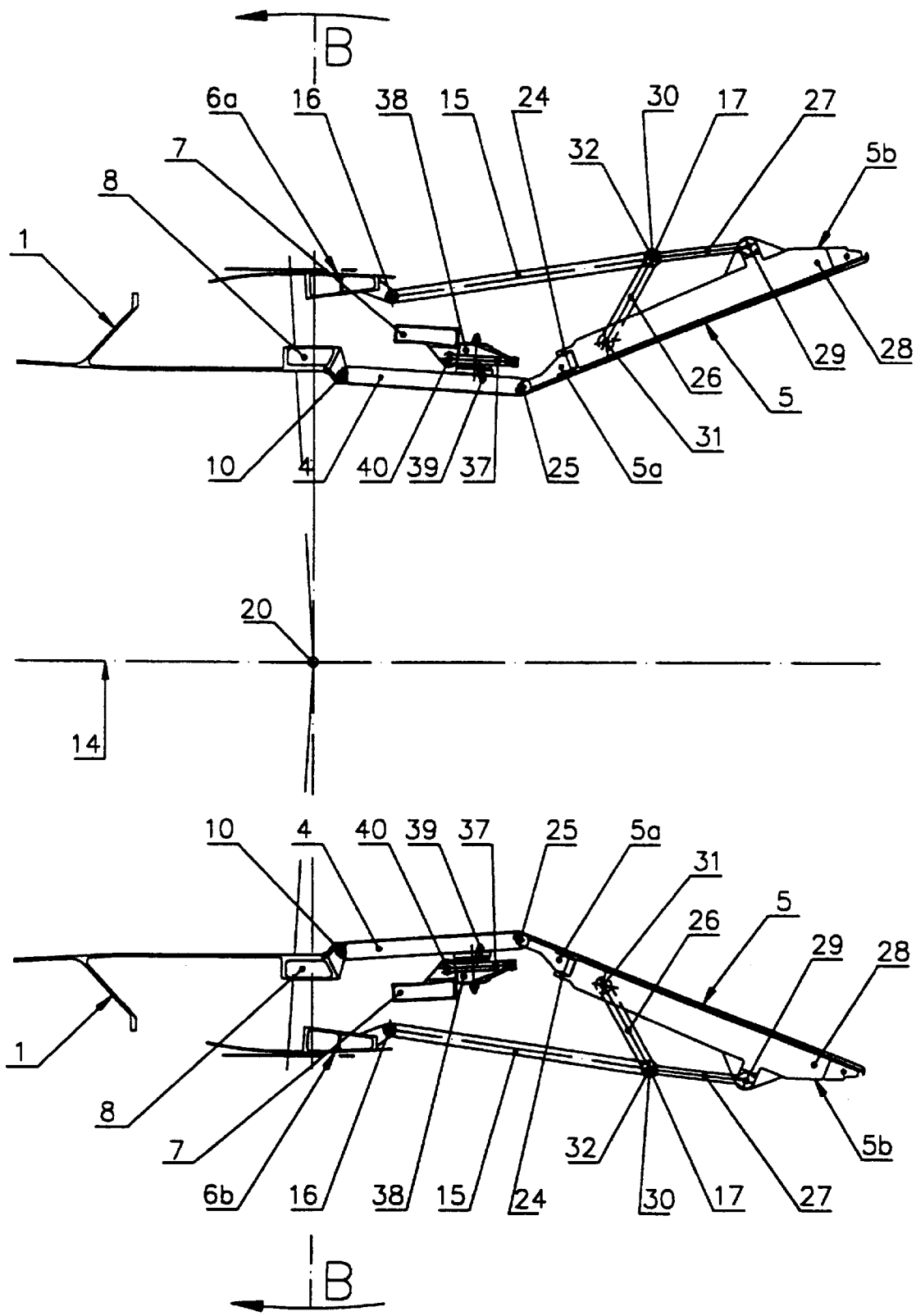
FIG. 9 shows the same longitudinal section of the first nozzle embodiment as shown in FIG. 6, the nozzle being in an open throat position and with the exit area being varied symmetrically.
Figure 10:
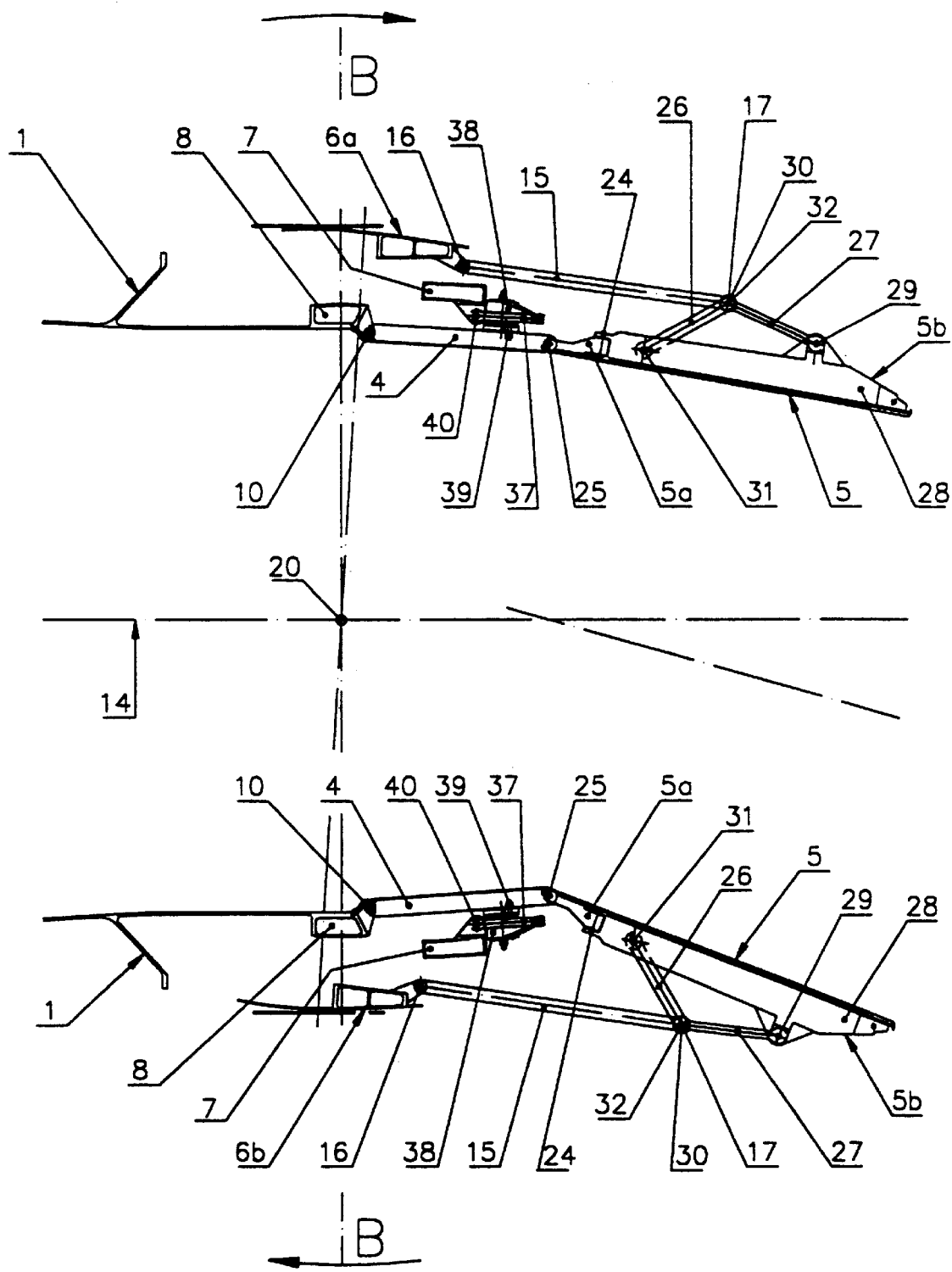
FIG. 10 the same longitudinal section of the first nozzle embodiment as shown in FIG. 6, the nozzle being in an open throat position, with vectoring of the flow of gas and without symmetrically varying the throat area or correcting it asymmetrically.
Figure 13:
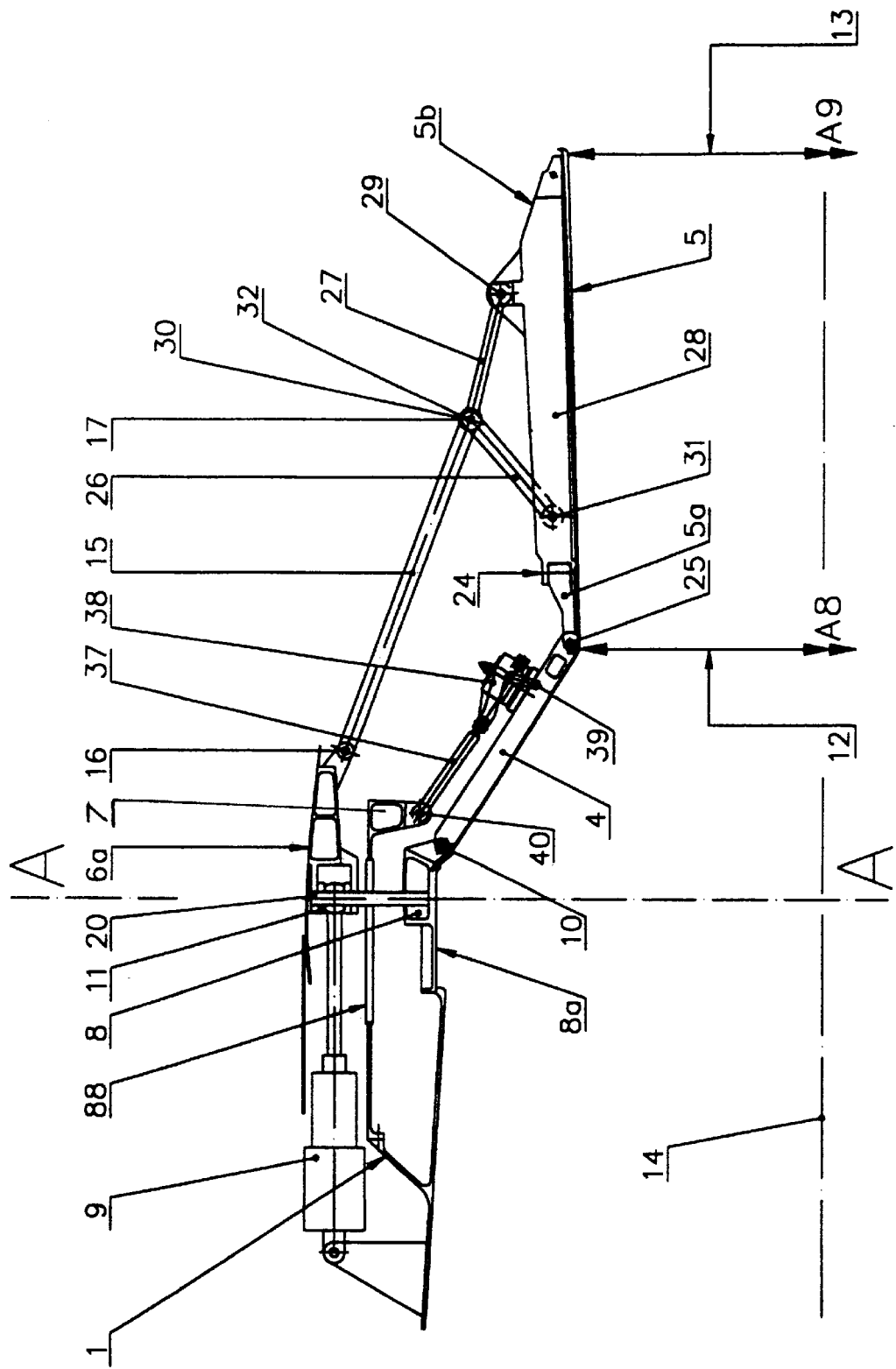
FIG. 13 is a longitudinal half-section, in the horizontal main longitudinal plane, of the second nozzle embodiment, the nozzle being in a closed-throat position, the exit area being without variation or correction and without vectoring of the thrust.
Figure 14:
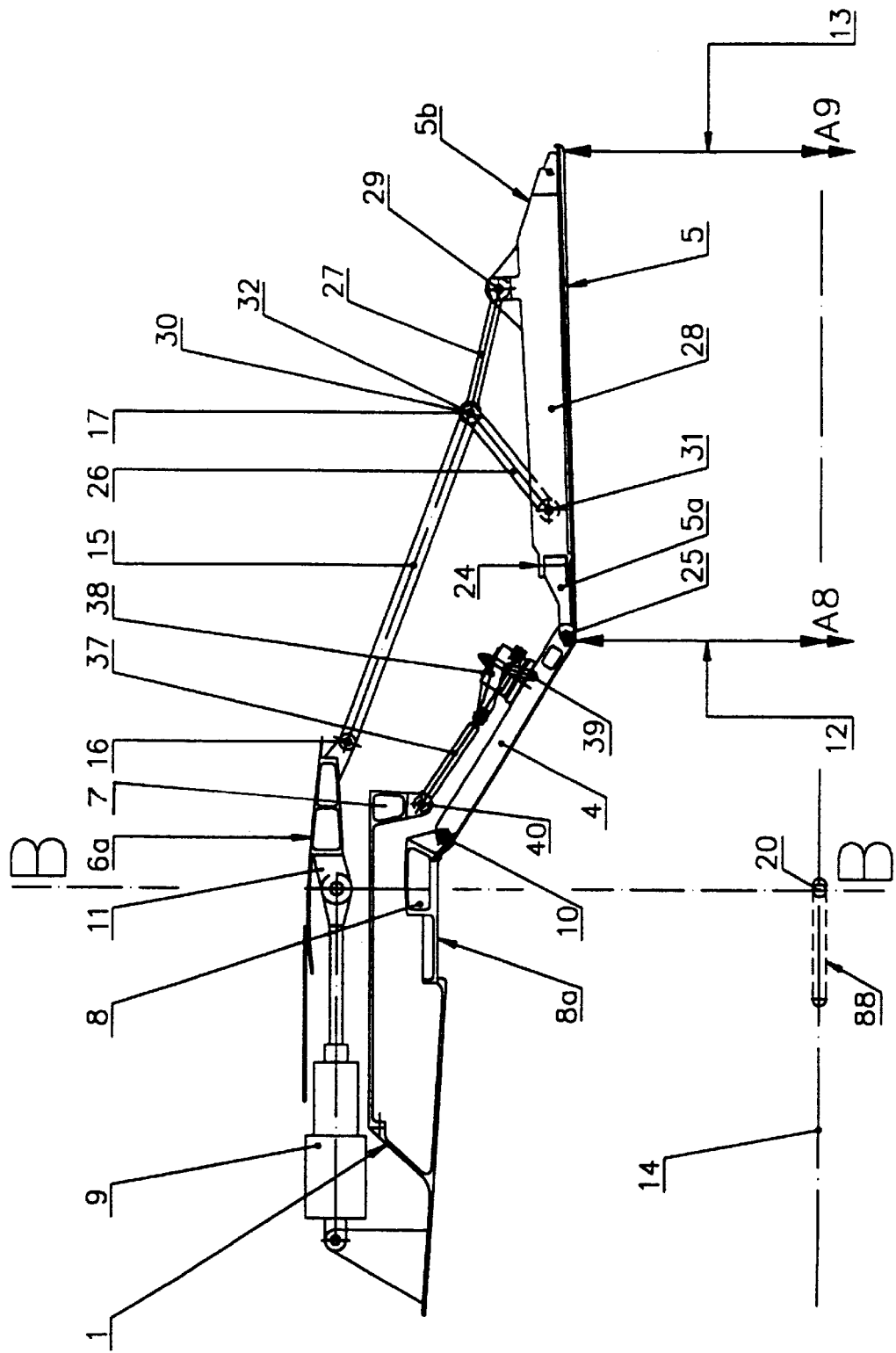
FIG. 14 is a longitudinal half-section, in the vertical main longitudinal plane, of the second nozzle embodiment, the nozzle being in the same position as shown in FIG. 13.

The two outer ring segments 6a and 6b are interconnected, at their articulated ends, by spindles 20, as shown in particular in FIGS. 2, 5 and 13. The spindles 20 are fixed to the fixed structure 1 itself of the engine, to which the inner ring 8 is rigidly attached. Furthermore, the outer ring segments 6a and 6b are related to the divergent master petals 5 by two-hinged bars 15 which are mounted concentrically around the axis 14 of the engine. Each two-hinged bar 15 is connected to an outer ring segment 6a or 6b by a cylindrical articulation 16, and each two-hinged bar 15 is connected to a divergent master petal 5 by a cylindrical articulation 17. Both cylindrical articulations 16 and 17 are arranged in such a manner that, without orientation of the flow, they are tangent to a theoretical circumference concentric to the longitudinal axis of the engine and located in a theoretical plane perpendicular to the longitudinal axis of the engine.

Outer ring segments 6a and 6b are guided laterally by flat systems of articulated bars, the components of which bear the numerals 50 to 55, together with the fixed structure 1 of the engine, FIG. 1, which permits swinging the outer ring segments 6a and 6b around the spindles 20. Each of the flat systems 50–55 is articulately connected at its downstream end with one of the outer ring segments, and is pivotably connected at its upstream end to the fixed structure of the engine. The guide systems described for the outer ring segments 6a and 6b must absorb the net shear forces which appear during the orientation of the flow and those due to asymmetries of the loads.

The perimetral mechanism for regulating the throat area A8, shown in FIG. 11, is formed, for each convergent master petal 4, of a connecting rod 37, a two-arm crank 38, and a peripheral bar 39. The connecting rod 37 is connected at its upstream end to the downstream end of the intermediate ring 7 by a spherical articulation 40. The connecting rod 37 is also connected at its downstream end to a first arm 41 of crank 38 which is mounted pivotally on a pivot which, forming an integral part of convergent master petal 4, has its axis perpendicular to the base of said convergent master petal. A second arm 43 of crank 38 is connected, by a spherical articulation 44, to a first end of the peripheral bar 39. A second end of the peripheral bar 39 is connected by a spherical articulation to the pivot of the adjacent convergent master petal in order for the assembly of cranks 38 and peripheral bars 39 of all the convergent master petals 4 to form a peripheral system which is closed on itself.

The above-described arrangement provides, by actuation of the control actuators 9 in one direction or the other, the following functions discussed above:

1. Axial movement of the intermediate ring 7, together with the two-hinged bars 15 and the convergent and divergent petals, is provided in order to regulate the throat area A8 denoted by reference numeral 12. Such axial movement of the intermediate ring 7 causes an angular displacement of the convergent master petals 4 through the perimetral mechanism for regulating the area of the throat A8 around the articulations 10. The convergent master petals 4, due to the connecting rods 37, the two-arm cranks 38, and the peripheral bars 39, open or close in a radial direction defining, together with the two-hinged bars 15, the position of the divergent master petals 5. In this function, the control actuators 9 always have the same length.

2. The outer ring segments 6a and 6b swing, as a single body, on the spindles 20 which pivotally interconnect them and are fixed in the fixed structure 1 of the engine, in order to obtain, through the two-hinged bars 15, orientation of the flow in a plane normal to the axis of said bolts 20.

3. To the above-described movements there is added the ability of symmetric relative swinging of the outer ring segments 6a and 6b in order to obtain, through the two-hinged bars 15, a bisymmetric variation of the exit area A9, denoted by reference numeral 13, with respect to an immobilized throat area A8, both during the orientation of the flow and when it is not oriented.

4. In an oriented flow geometry, with independent swinging of only one of the outer ring segments 6a or 6b, the exit area A9, denoted by reference numeral 13, may be asymmetrically corrected through the two-hinged bars 15. In this fourth function, only those actuators of the control system which move the swung outer ring segment present a negative increment.

The four functions can be realized simultaneously by the present invention.

In the vectoring function, the two-hinged bars 15, which are connected by a cylindrical articulation 16 to the outer ring segments 6a or 6b, turn with said outer ring segments and compel the divergent master petals 5 to move in a radial direction and also in a tangential direction, thus making it possible to orient the flow. Each divergent master petal 5 is divided into two segments, a non-vectorable segment 5a and a vectorable segment 5b, which are connected to each other by a cylindrical articulation 24 arranged in a direction perpendicular to the center line of the base of the petal 5. The non-vectorable segment 5a is connected by a cylindrical articulation 25 to the convergent master petal 4. The downstream, vectorable segment 5b of each divergent master petal 5 is formed with an upstream intermediate bar 26, a downstream intermediate bar 27, and a stiffened plate 28, the inner surface of which may be in contact with the flow of gases, as described in Spanish Patent Application No. 9302455 of 1993. The upstream intermediate bar 26 is interconnected to the two-hinged bar 15 by a cylindrical articulation 30 and to the vectorable segment 5b by a spherical joint 31. Cylindrical articulation 30 is also connected to the downstream end of vectorable segment 5b by downstream intermediate bar 27 with spherical joints 32 and 29.

Similar radial and tangential movements with respect to the articulation axis 20 are present in the third function, and only in half circumference when the fourth function is concerned.

In FIGS. 2 to 10 and 13 to 25, for reasons of clarity there have not been shown movable members 35 and 36 which constitute the movable casing of the nozzle, which members are similar to those described in Spanish Patent No. 9200369 of 1992. Said movable members 35 and 36 are shown only in FIGS. 1 and 12.

FIGS. 12 to 18 illustrate the second embodiment of an axisymmetric nozzle of the present invention. The second embodiment nozzle includes a single control system in which, differing from the first nozzle embodiment shown in FIGS. 1 to 10, the intermediate ring loses its mobility incorporated with the fixed structure of the engine, and the two spindles which interconnect the articulated ends of the two outer ring segments are connected rigidly to the inner ring 8. In addition, the fixed structure 1 of the engine includes two longitudinal grooves 88 through which the spindles 20 reach the inner ring 8.

Figure 12:
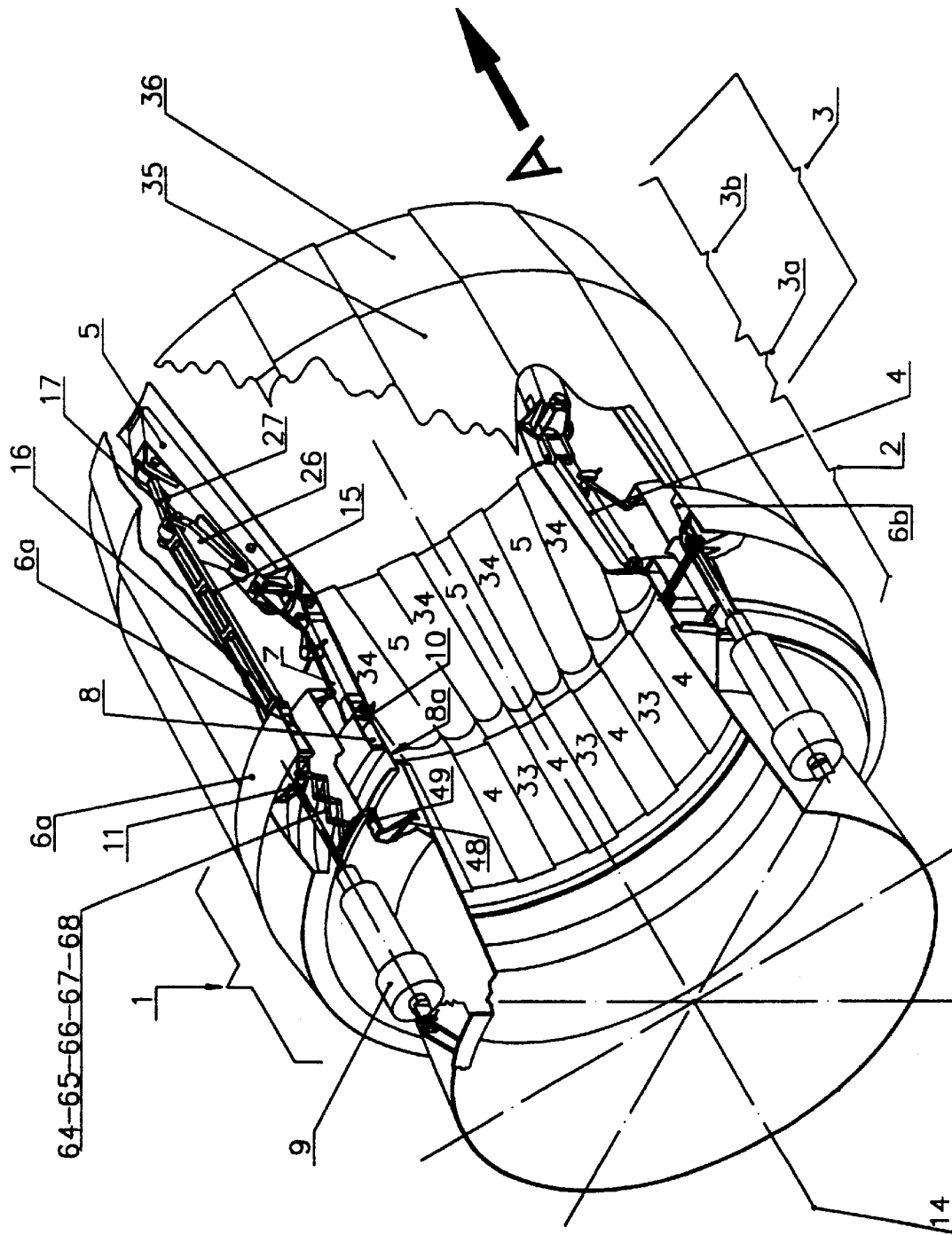
FIG. 12 is a perspective view, partially in section, of a second embodiment of an axisymmetric nozzle of variable geometry and orientation of the flow of the present invention, having a single control system for regulating the throat area and for varying asymmetrically the exit area, orienting the flow, and asymmetrically correcting the exit area, the control system including the perimetral mechanism for regulating the throat area set forth in Spanish Patent No. 9401114.

FIG. 12 shows a diagrammatic, perspective view, partially in section, of this second embodiment nozzle, the arrow A indicating the direction of the flow or circulation of the gases. As with traditional nozzles, the nozzle shown in FIG. 12 includes a rear casing 1, which constitutes the final end of the fixed structure of the engine, a convergent zone 2 and a divergent zone 3. The convergent zone 2 is formed of a plurality of master petals 4 and slave petals 33 which define a throat A8 indicated by the reference numeral 12. In the same way, the divergent zone 3 is formed by master petals 5 and slave petals 34 and is divided into two parts: a non-vectorable portion 3a and a vectorable portion 3b.

Regulation of the throat area A8 and orientation of the flow are effected by a single control system which is formed, in combination, by a unitary, movable inner ring 8, and by an outer ring 6 formed of two interarticulated outer ring segments 6a and 6b. The components of the combination of ring and ring segments are concentric to each other and to the longitudinal axis 14 of the engine. The control system further includes a plurality of control actuators 9 which are articulated at their upstream end to the fixed structure 1 of the engine.

The convergent master petals 4 are connected, at their upstream end, to the inner ring 8 by cylindrical articulations 10 tangential to a theoretical circumference concentric to the longitudinal axis of the engine and located in a theoretical plane perpendicular to the longitudinal axis of the engine.

Figure 15:
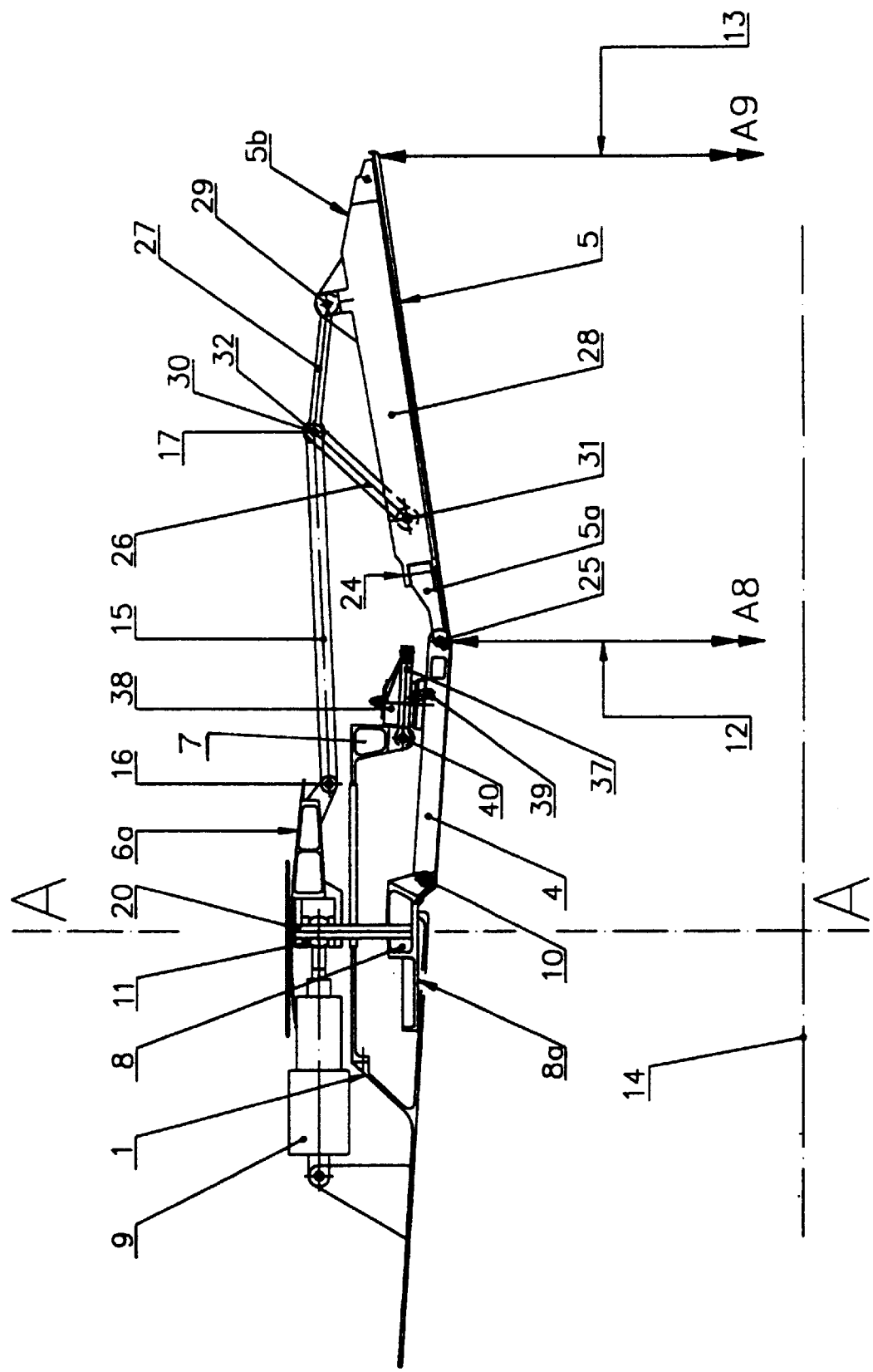
FIG. 15 is a longitudinal half-section, in the horizontal main longitudinal plane, of the second nozzle embodiment, the nozzle being in an open throat position, the exit area being without variation or correction and without vectoring of the thrust.
Figure 16:
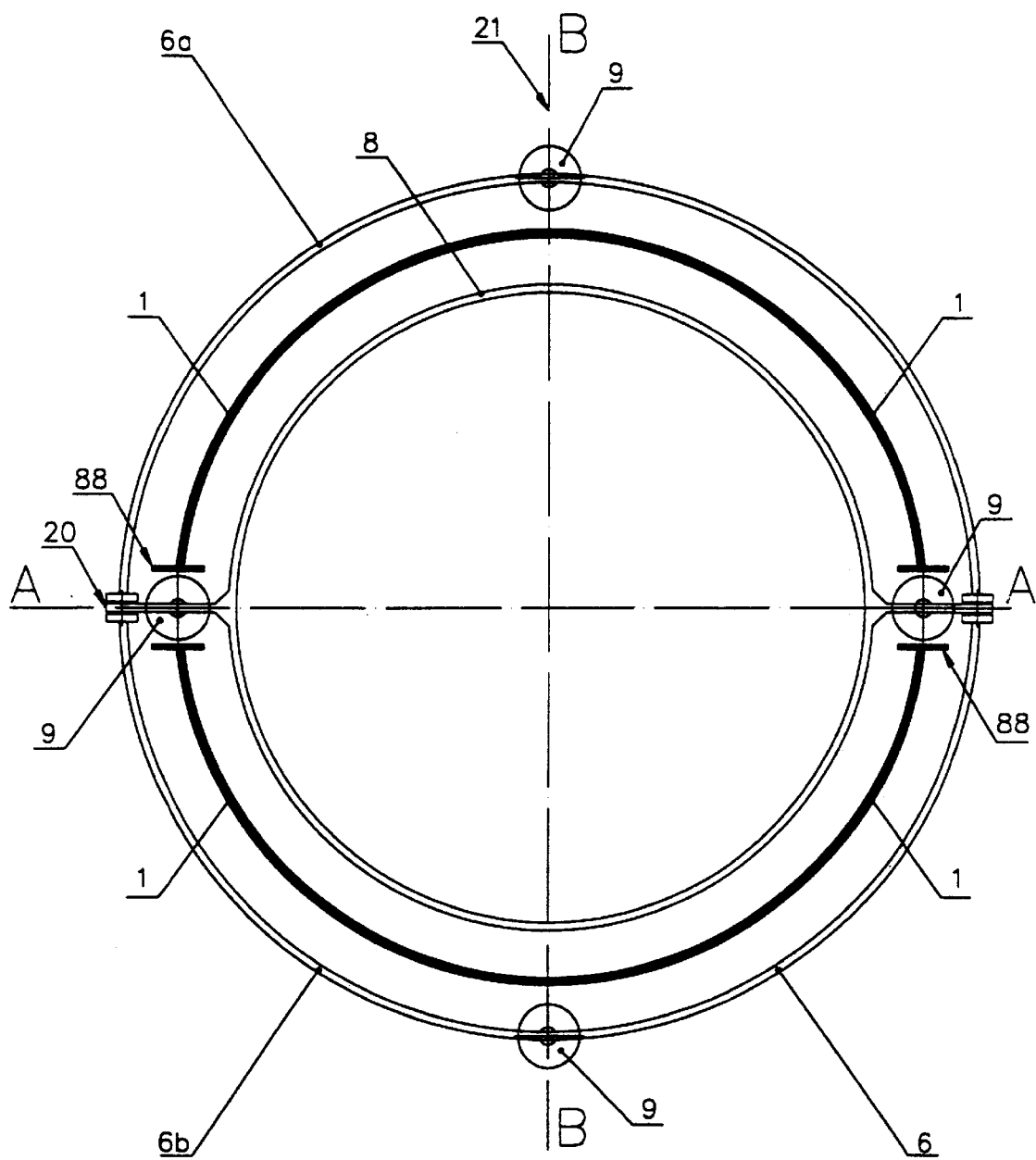
FIG. 16 is a cross-section through the second nozzle embodiment, taken along the section line B—B of FIG. 17, showing connections between an inner ring and two outer ring segments which, together with the linear actuators, form the single control system.
Figure 17:
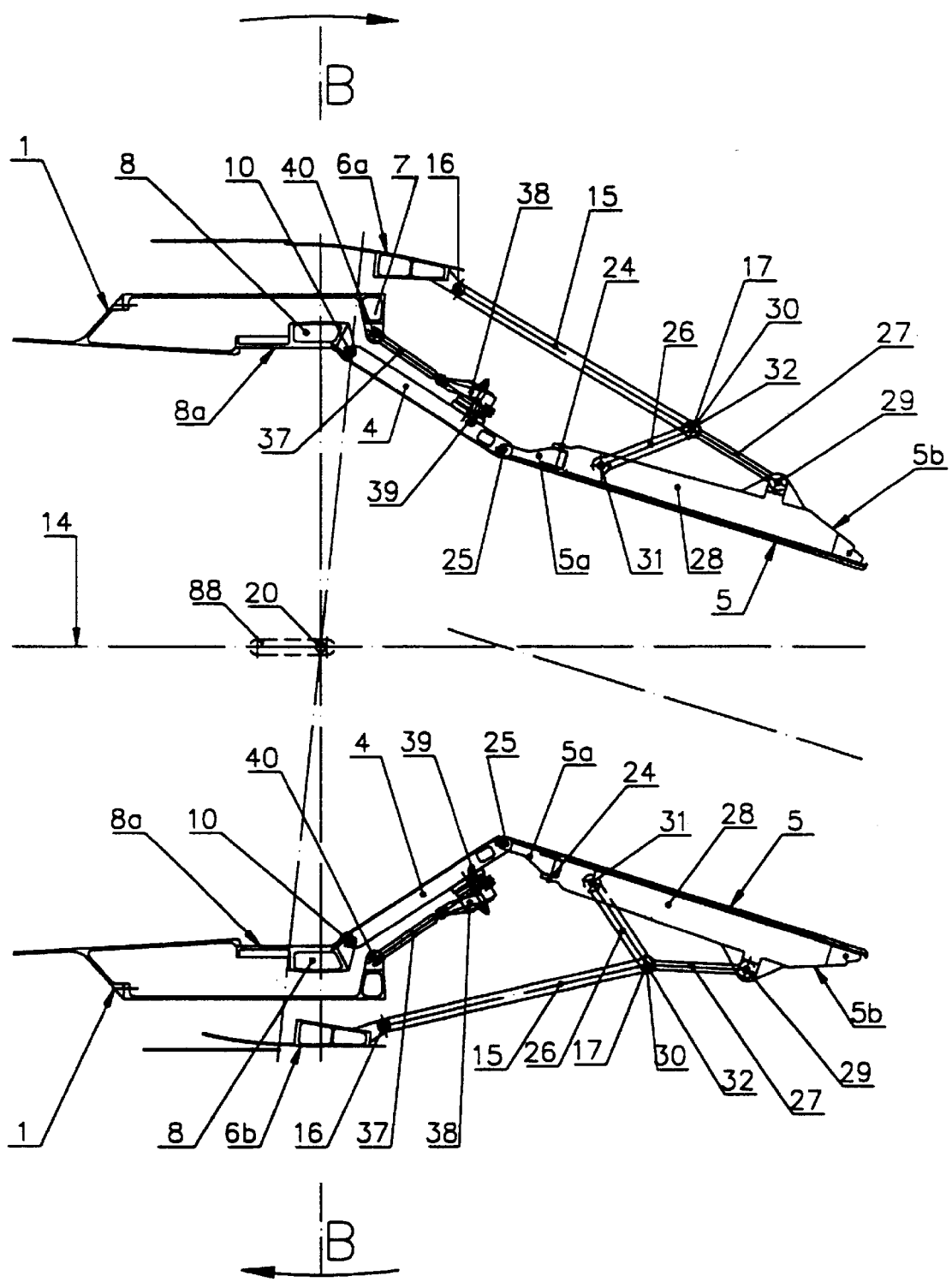
FIG. 17 is a longitudinal section, in the vertical main longitudinal plane, taken along the section line B—B of FIG. 16, of the second nozzle embodiment, the nozzle being in a closed throat position, with vectoring of the thrust and the exit area being without variation or correction, the arrows indicating the swing directions of each of the two outer ring segments.
Figure 18:
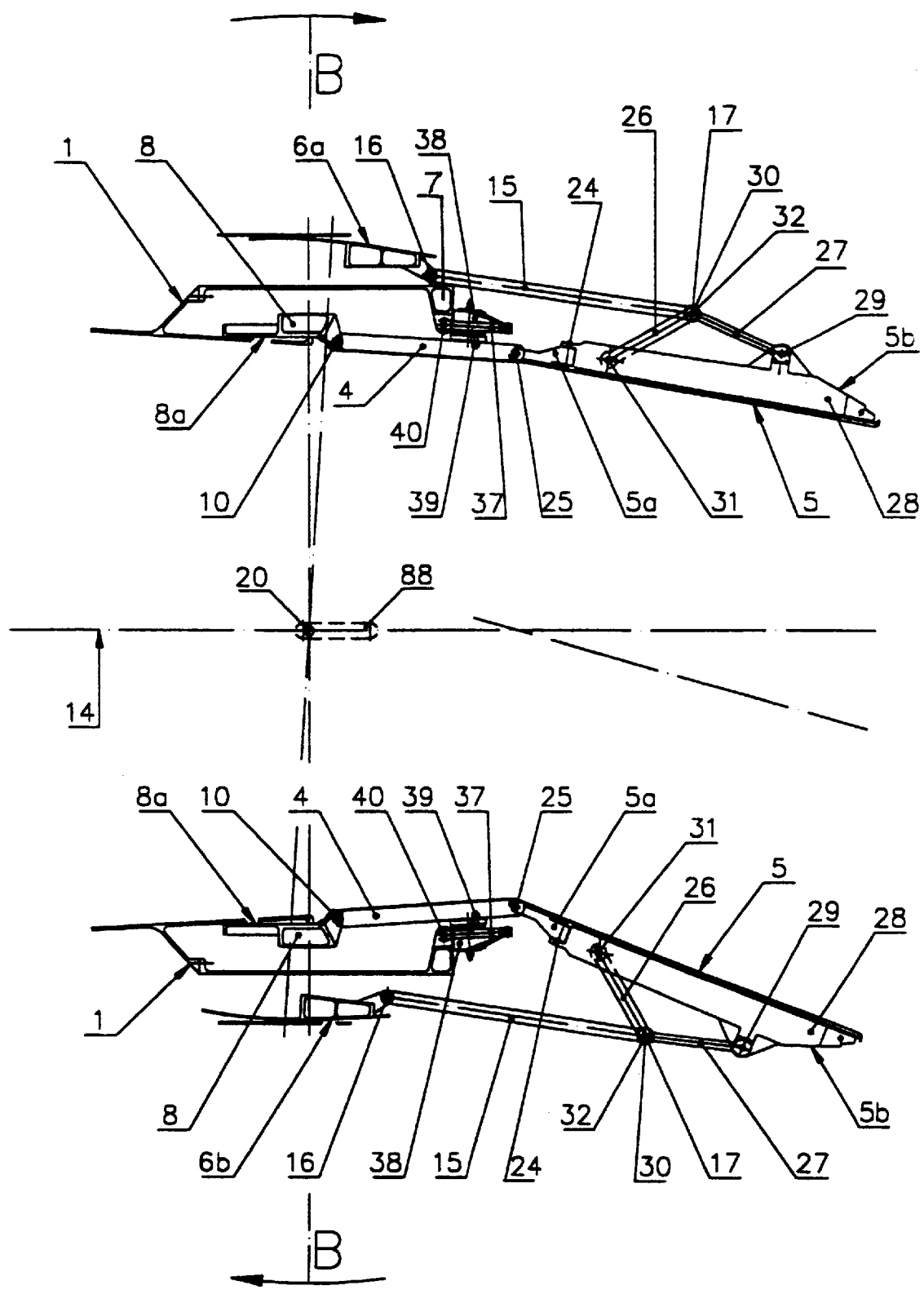
FIG. 18 shows the same longitudinal section of the second nozzle embodiment as shown in FIG. 17, the nozzle being in an open-throat position, with vectoring of the thrust and the exit area being without variation or correction.

The downstream ends of the control actuators 9 are connected, by spherical articulations 11, shown in particular in FIGS. 13 and 15, to the outer ring segments 6a and 6b and to the cylindrical articulation connecting said outer ring segments, defined by the spindles 20, shown in particular in FIGS. 13 and 15. Furthermore, the outer ring segments 6a and 6b are connected to the divergent master petals 5 by two-hinged bars 15 which are mounted concentrically around the longitudinal axis 14 of the engine. Each two-hinged bar 15 is connected to the outer ring segments 6a and 6b by a cylindrical articulation 16, and to the divergent master petal 5 by a cylindrical articulation 17. Both cylindrical articulations 16 and 17 are disposed in such a manner that, without orientation of the flow, they are tangent to a theoretical circumference concentric to the longitudinal axis of the engine and located in a theoretical plane perpendicular to said longitudinal axis of the engine.

The control system of the nozzle includes, furthermore, a mechanism for regulating the throat area A8, shown in FIG. 11, which is formed, for each convergent master petal, of a connecting rod 37, a two-arm crank 38, and a peripheral bar 39. The connecting rod 37 is connected, at its upstream end, by a spherical articulation 40 to the intermediate ring 7 incorporated with the downstream end of the fixed structure 1 of the engine. The connecting rod 37 is also connected at its downstream end to a first arm 41 of crank 38 which is articulately mounted on a pivot which, forming an integral part of convergent master petal 4, has its axis perpendicular to the base of said convergent master petal. A second arm 43 of crank 38 is connected, by spherical articulation 44, to a first end of the peripheral bar 39. A second end of the peripheral bar 39 is connected by a spherical articulation to the pivot of the adjacent convergent master petal in order for the assembly of cranks 38 and peripheral bars 39 of all the convergent master petals 4 to form a peripheral system which is closed on itself.

As can be seen from FIGS. 12 to 15, the inner ring 8 has a cylindrical extension 8a by which the after-burner is sealed during the adjustment of the throat area A8, reference numeral 12, of the nozzle. The axis of this cylindrical extension 8a should be located on the longitudinal axis 14 of the engine, for which there are present on the upstream end of said cylindrical extension 8a at least three hinges for connection to the fixed structure 1 of the engine, each having two leaves, designated 48 and 49 in FIG. 12, which permit inner ring 8 to move in only an axial direction.

The outer ring segments 6a and 6b are guided laterally by flat systems of articulated bars, the components of which are indicated by the numerals 64 to 68, for connection with the fixed structure 1 of the engine, FIG. 12, which make it possible to move the outer ring segments only in an axial direction, thereby permitting the outer ring segments 6a and 6b to swing about the spindles 20. Each of the flat systems 64–68 is articulately connected at its downstream end to the assembly of outer ring segments 6a and 6b, and is articulately connected at its upstream end to the fixed structure 1 of the engine. The guide systems described for the outer ring segments 6a and 6b and inner ring 8 must absorb the net shear forces which appear during the orientation of the flow and those due to asymmetries of the loads.

The above-described arrangement provides, by actuation of the control actuators 9 in one direction or the other, the following functions discussed above:

1. Axial movement, in the same direction, of the assembly of outer ring segments 6a and 6b and inner ring 8, together with the two-hinged bars and the convergent and divergent petals, is provided in order to regulate the throat area A8 denoted by reference numeral 12. Such axial movement of the outer ring segments 6a and 6b and inner ring 8 causes an angular displacement of the convergent master petals 4 through the perimetral mechanism to regulate the area of the throat A8 around the articulations 10. The convergent master petals 4, due to the connecting rods 37, the two-arm cranks 38, and the peripheral bars 39, open or close in a radial direction defining, together with the two-hinged bars 15, the position of the divergent master petals 5. In this function, the control actuators 9 always have the same length.

2. The outer ring segments 6a and 6b swing, as a single body, on a theoretical spherical surface centered on the longitudinal axis 14 of the engine, the inner ring 8 remaining immobilized in any axial position in order to obtain, through the two-hinged bars 15, orientation of the flow in any direction around the longitudinal axis 14 of the engine. In this second function, the control actuators 9 have different lengths.

3. To the above-described movements there is added the ability of symmetric relative swinging of the outer ring segments 6a and 6b in order to obtain, through the two-hinged bars 15, a bisymmetric variation of the exit area A9, denoted by reference numeral 13 in FIGS. 13 to 15, with an immobilized throat area A8, both orienting and without orienting the flow. In this third function, the actuators of the control systems which move the outer ring segments have equal path increments.

4. In an oriented flow geometry, with independent swinging of only one of the outer ring segments 6a or 6b, the exit area A9 is corrected asymmetrically through the two-hinged bars 15. In this fourth function, only those actuators of the control system which move the swung outer ring segment have a negative increment.

The four functions can be realized simultaneously in the present invention.

The participation of the other components of this single control system nozzle is substantially identical to what has already been described with respect to the first nozzle embodiment.

Figure 19:
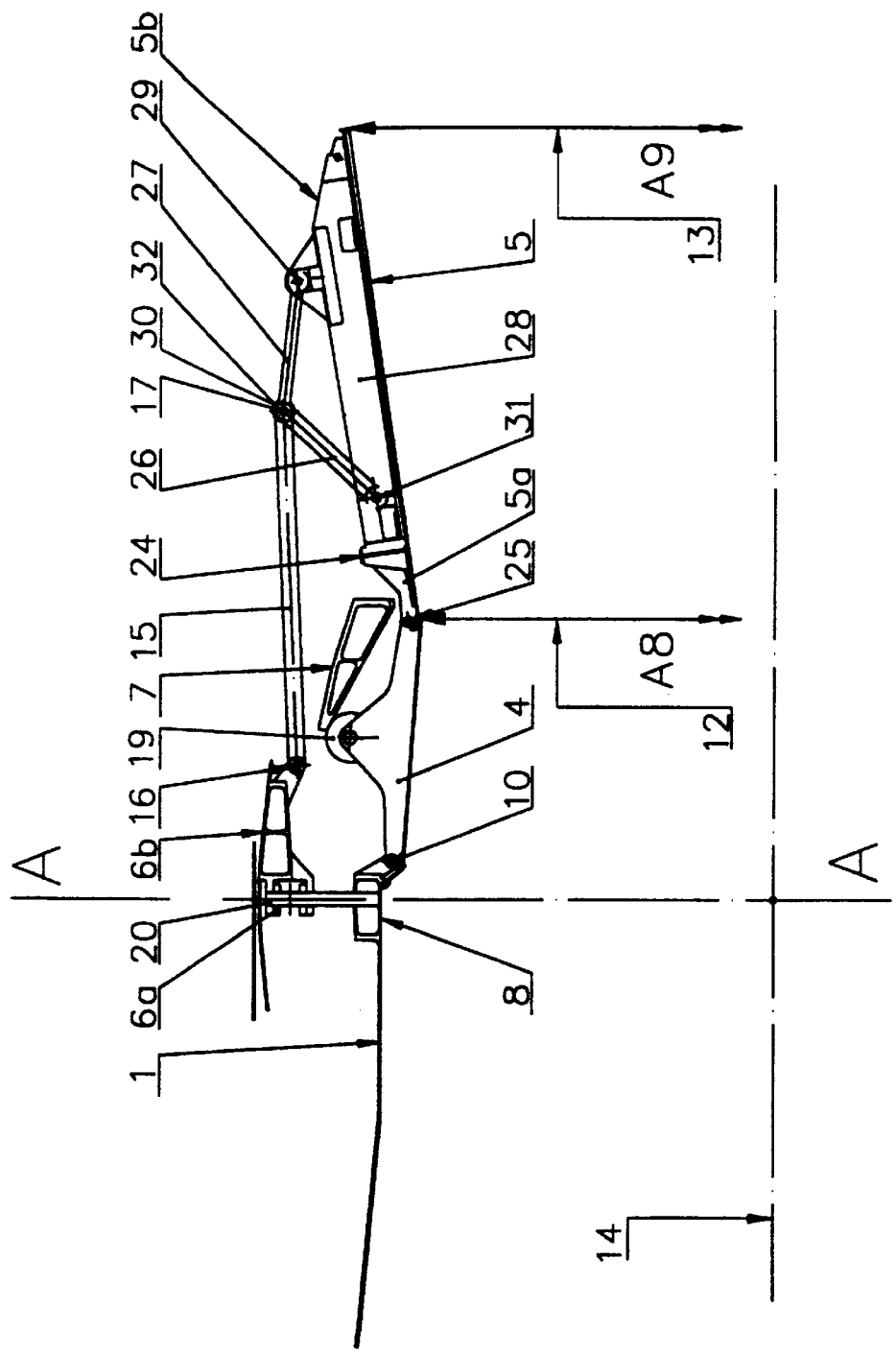
FIG. 19 is a longitudinal half-section, in the horizontal main longitudinal plane, of a third nozzle embodiment of the present invention, formed with two independent control systems, one to regulate the throat area and the other to symmetrically vary the exit area with respect to an immobilized throat area and to vector the flow of gas and asymmetrically correct said exit area, a conventional cam and roller mechanism, known in the prior art, forming part of the system for regulating the area of the throat, FIG. 5 also representing the cross-section through this third embodiment nozzle with two control systems.
Figure 20:
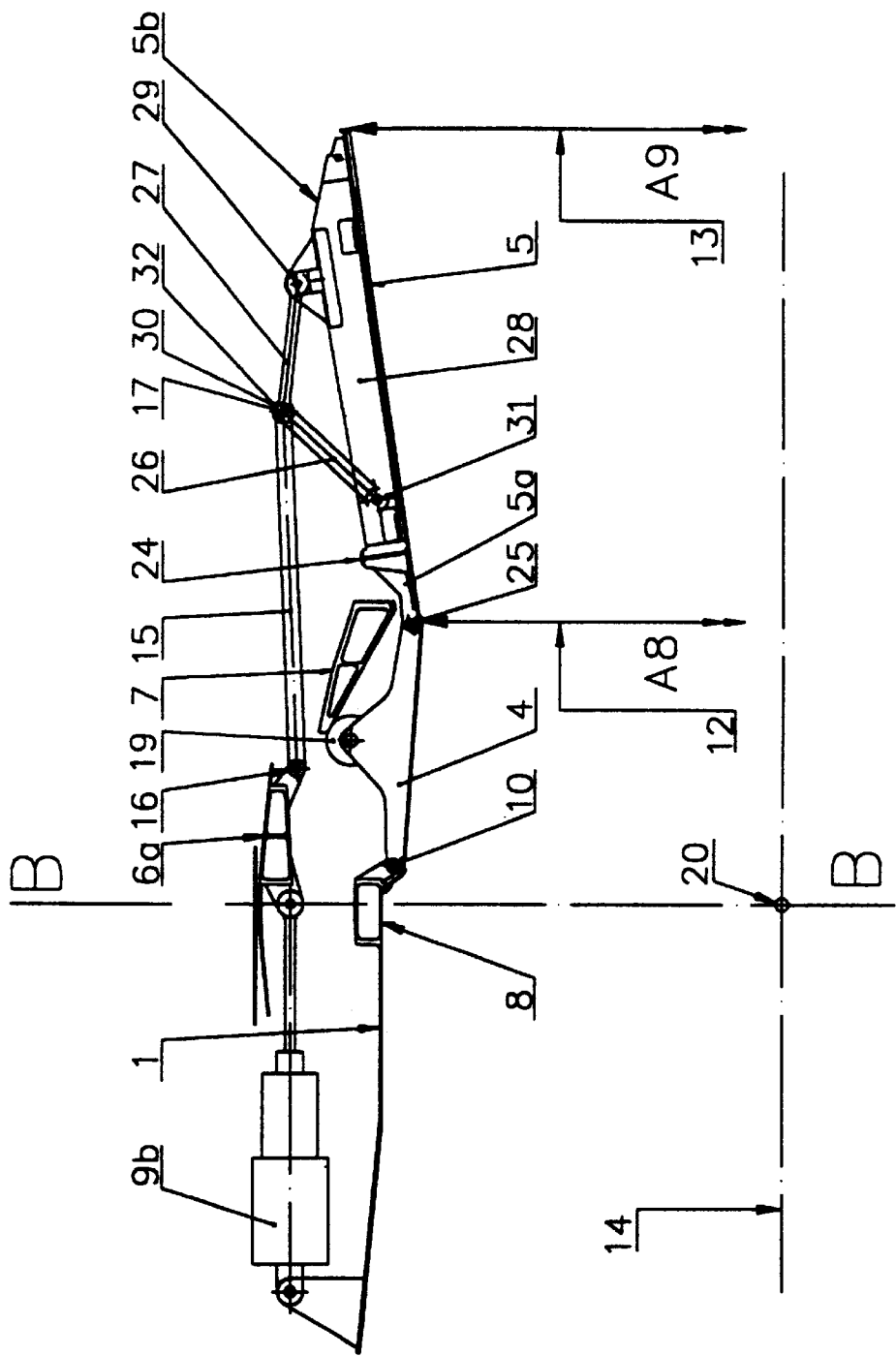
FIG. 20 is a longitudinal half-section, in the vertical main longitudinal plane, of the third nozzle embodiment, the nozzle being in an open-throat position without vectoring of the thrust and the exit area being without variation or correction.
Figure 21:
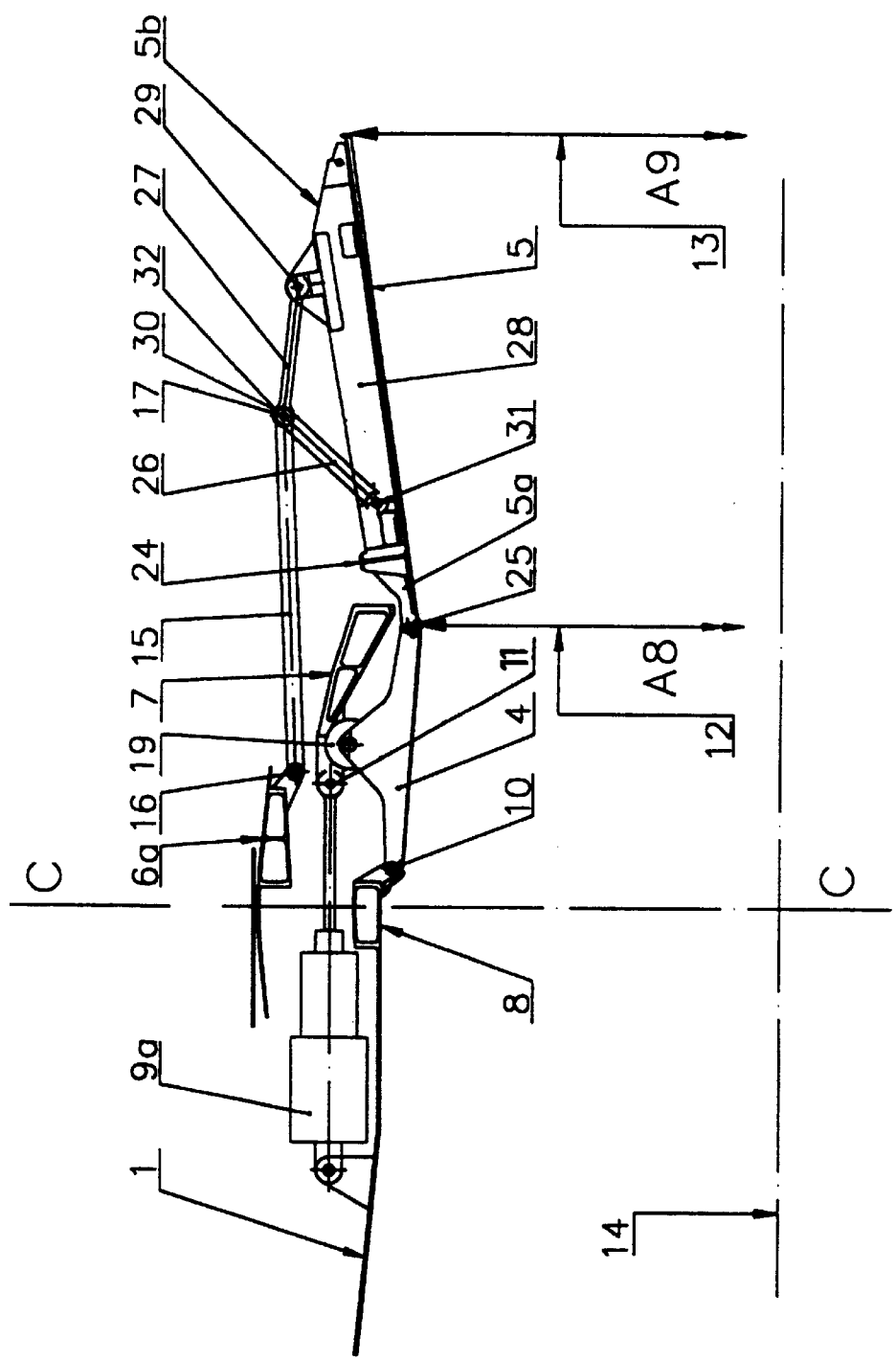
FIG. 21 is a longitudinal half-section, in a longitudinal plane which forms an angle of 45 degrees with the horizontal main longitudinal plane, of the third nozzle embodiment, the nozzle being in an open-throat position, without vectoring of the thrust, and the exit area being without variation or correction.
Figure 22:
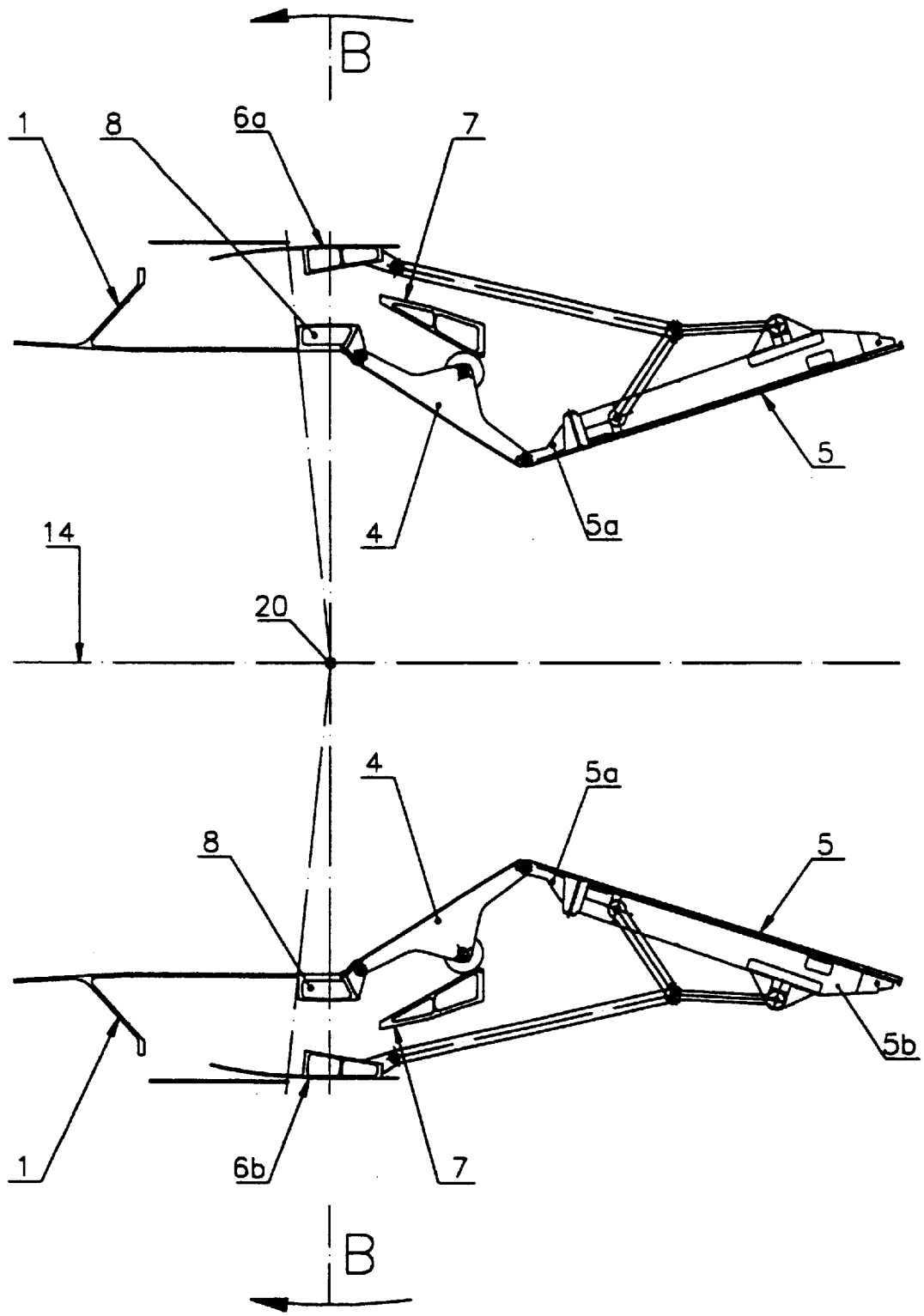
FIG. 22 is a longitudinal cross-section of the third nozzle embodiment, in the vertical main longitudinal plane, along the section line B—B of FIG. 5, the nozzle being in a closed throat position, the exit area being varied symmetrically and without vectoring of the thrust or correction of the exit area, the arrows indicating the swing direction of the two outer ring segments.
Figure 23:
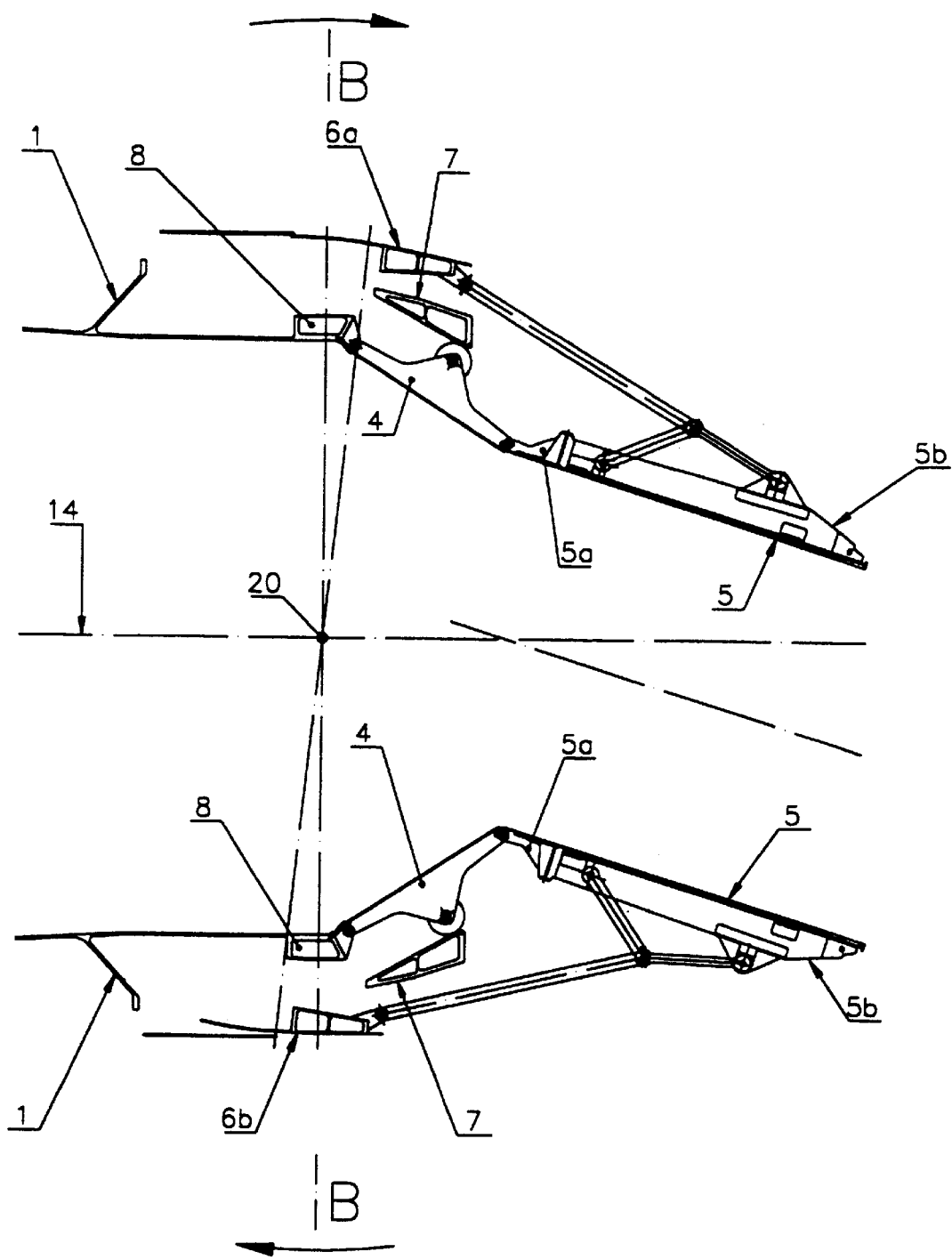
FIG. 23 shows the same longitudinal section shown in FIG. 22 of the third nozzle embodiment, the nozzle being in a closed-throat position, with vectoring of the thrust, and the exit area being without variation or correction.
Figure 24:
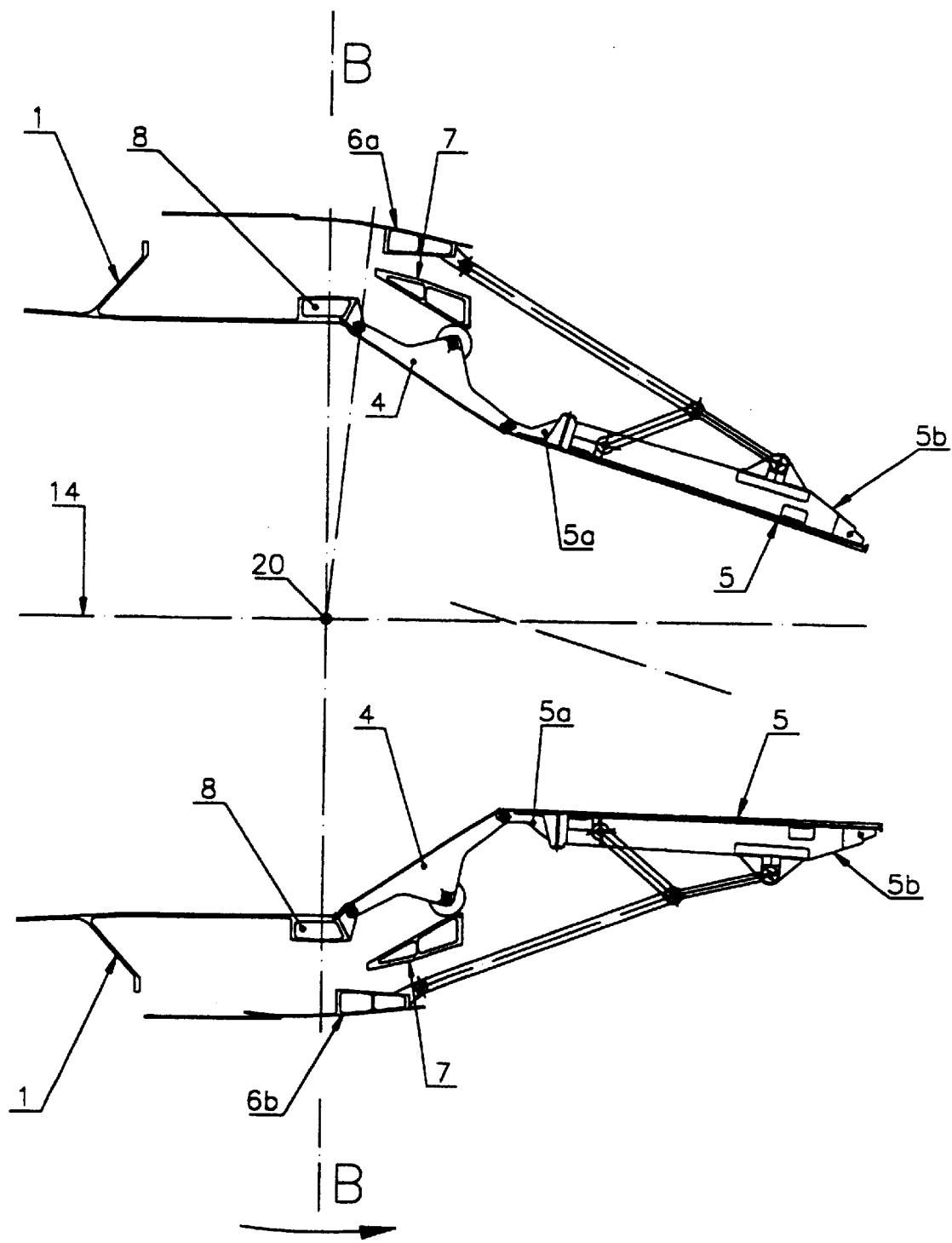
FIG. 24 shows the same longitudinal section shown in FIG. 22 through the third nozzle embodiment, the nozzle being in a closed-throat position, without symmetric variation of the exit area, with vectoring of the thrust, and the exit area being corrected asymmetrically, the arrow indicating the swing direction of the lower ring segment for correcting the exit area.
Figure 25:
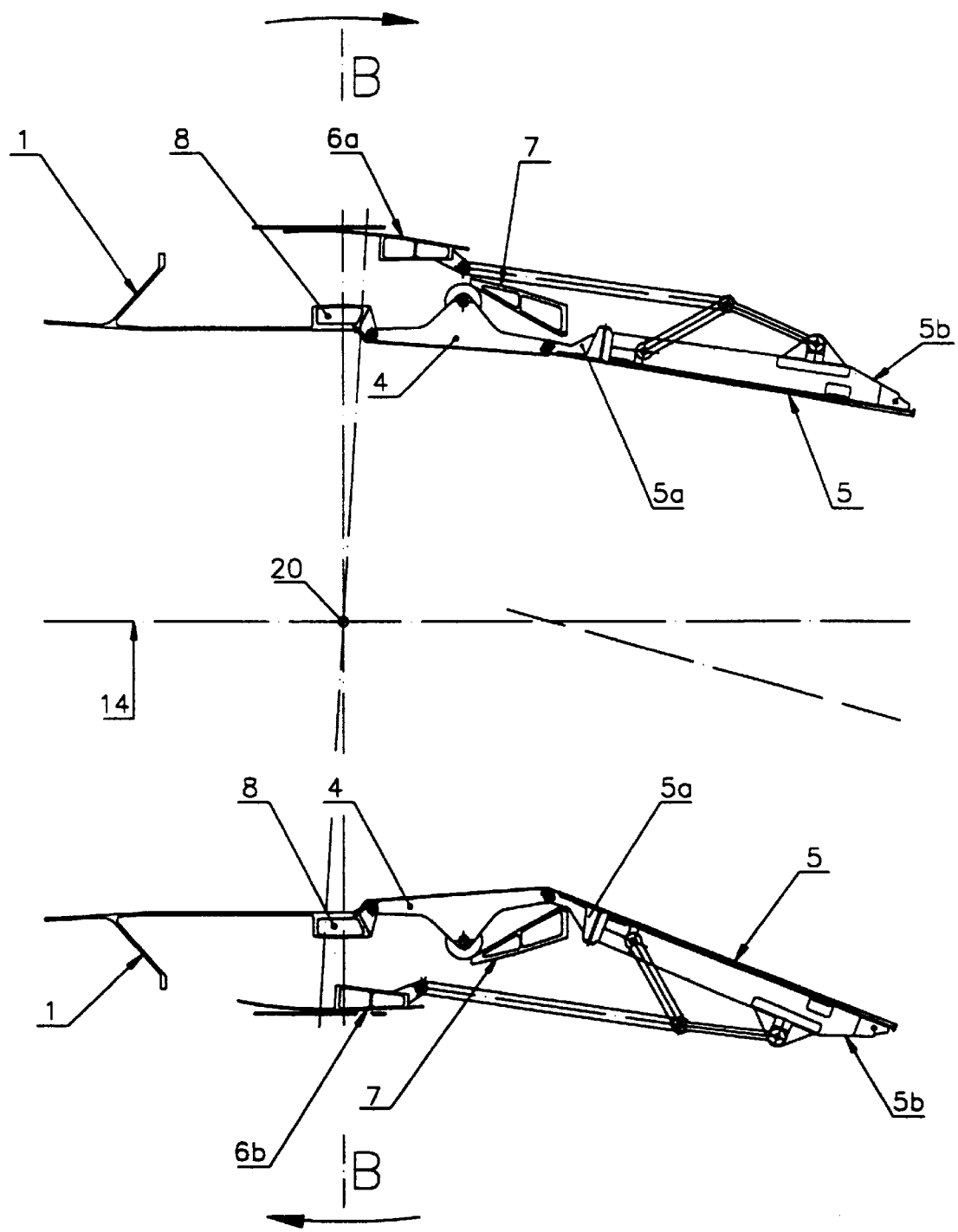
FIG. 25 shows the same longitudinal section shown in FIG. 22 of the third nozzle embodiment, the nozzle being in an open-throat position, with vectoring of the thrust, and the exit area being without variation or correction.

FIG. 19 shows a longitudinal half-section, in a horizontal main longitudinal plane, of the third nozzle embodiment of the present invention, having two systems of control and a plurality of conventional cam and roller mechanisms forming part of the system for regulating the area of the throat A8 indicated by reference number 12. As with traditional variable-geometry axisymmetric nozzles, the nozzle shown in FIGS. 19 to 25, includes the same parts indicated in the description of the first general nozzle embodiment but, differing from the first embodiment, the perimetrical mechanism, which components are indicated by references 37 to 44 in FIGS. 2 to 11, is substituted by a plurality of cam and roller mechanisms, one for each convergent master petal 4. The plurality of cams of said mechanisms are incorporated in the intermediate ring 7, and the roller mounted in the convergent master petal 4 is indicated in FIGS. 19 to 21 by reference number 19.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A thrust vectoring variable geometry axisymmetric nozzle for a gas turbine engine for an aircraft, the engine having a direction of gas flow, the nozzle comprising:

a plurality of convergent master petals and a plurality of convergent slave petals forming a convergent zone defining a throat of variable area;

a plurality of divergent master petals and a plurality of divergent slave petals, the plurality of divergent slave petals being connected to adjacent divergent master petals by a centering mechanism and forming a divergent zone following the convergent zone in the direction of gas flow;

the petals forming the convergent and divergent zones being distributed about a longitudinal axis of the engine;

each divergent master petal comprising an upstream segment and a downstream segment, the segments of each divergent master petal being articulately connected;

control means for regulating the throat area and vectoring the thrust, the control means comprising an inner ring, an intermediate ring, and an outer ring, which rings are concentric to each other and to the longitudinal axis of the engine, each of the convergent master petals being articulately connected to the inner ring, and a plurality of linear actuators, each linear actuator having an upstream end and a downstream end;

each of the linear actuators being articulately connected at its upstream end to a fixed structure of the engine, each actuator of a first art of the plurality of linear actuators having its downstream end articulately connected to the outer ring and each actuator of a second part of the plurality of linear actuators having its downstream end articulately connected to the intermediate ring;

each of the rings being independently connected to the fixed structure of the engine by support means which do not interconnect the rings and which maintain each ring in a laterally fixed orientation;

a set of two-hinged bars, one for each divergent master petal, interconnecting the downstream segments of the divergent master petals with the outer ring;

thrust vectoring in the divergent zone being obtained by inclining the outer ring with a center of swing located on the longitudinal axis of the engine via the set of two-hinged bars; and the outer ring including two outer ring segments interarticulated to each other by a pair of cylindrical articulations which permit symmetrical variation of an exit area with respect to an immobilized throat area by simultaneously swinging the two outer ring segments in opposite directions, and during vectoring of the gas flow, by independently swinging one of the two outer ring segments to correct the exit area asymmetrically while the other of the two outer ring segments remains immobilized, the swing of the two outer ring segments being limited to a single plane thereby permitting vectoring of the thrust in a single plane, the single plane corresponding to a pitch of the aircraft.

2. The nozzle of claim 1, wherein each convergent slave petal rests on at least one adjacent convergent master petal.

3. The nozzle of claim 1, wherein each divergent slave petal rests on at least one adjacent divergent master petal.

4. The nozzle of claim 1, wherein the petals forming the convergent and divergent zones are distributed circumferentially about the longitudinal axis of the engine.

5. The nozzle of claim 2, wherein each convergent master petal is connected to a divergent master petal by a tangential cylindrical articulation having an axis perpendicular to the longitudinal axis of the engine.

6. The nozzle of claim 5, wherein the segments of each divergent master petal are connected together by a cylindrical articulation having an axis perpendicular to the axis of the tangential cylindrical articulation connecting the divergent master petal to the corresponding convergent master petal.

7. The nozzle of claim 1, wherein each of the convergent master petals is connected to the inner ring by a cylindrical articulation having an axis tangential to the longitudinal axis of the engine.

8. The nozzle of claim 1, wherein each linear actuator of the first part of the plurality of linear actuators has its downstream end articulately connected to a spherical articulation of the outer ring.

9. The nozzle of claim 1, wherein each linear actuator of the second part of the plurality of linear actuators has its downstream end articulately connected to a spherical articulation of the intermediate ring.

10. The nozzle of claim 1, wherein the inner ring, the intermediate ring and the two interarticulated outer ring segments are separated from each other and comprise, in combination with the plurality of linear actuators and the control means for regulating the throat area, two control systems, wherein:

regulation of the throat area is obtained by axial displacement of only the intermediate ring, and symmetric variation of the exit area with respect to the immobilized throat area is obtained by simultaneously swinging the two outer ring segments in opposite directions;

thrust vectoring is obtained by simultaneously swinging the two segments of the outer ring in the same direction with a single center of swing on the longitudinal axis of the engine; and asymmetric correction of the exit area, during thrust vectoring, is obtained by independently swinging one of the two outer ring segments while the other outer ring segment remains immobilized.

11. The nozzle of claim 10, wherein the segments of the outer ring are interconnected by a pair of spindles fixed in the fixed structure of the engine, the longitudinal axes of the spindles being normal to the longitudinal axis of the engine and being in a horizontal plane which contains the longitudinal axis of the engine.

12. The nozzle of claim 1, wherein the intermediate ring is incorporated to the fixed structure of the engine and the control means comprising the inner ring and the outer ring, the outer ring segments are interarticulated by a pair of spindles fitted in the inner ring, the longitudinal axes of said spindles being normal to the longitudinal axis of the engine and being located in a horizontal plane which contains the longitudinal axis of the engine, thereby forming a single control system in combination with only the first part of the plurality of linear actuators and the mechanism for the regulating of the throat area, wherein:

regulation of the throat area is obtained by an axial displacement of the assembly of the inner ring and the outer ring segments;

symmetric variation of the exit area with respect to an immobilized throat area is obtained by simultaneously swinging the two outer ring segments in opposite directions;

thrust vectoring is obtained by simultaneously swinging the two outer ring segments in the same direction with a center of swing on the longitudinal axis of the engine; and asymmetric correction of the exit area, during thrust vectoring, is obtained by independently swinging one of the two outer ring segments, while the other outer ring segment remains stationary.

* * * * *